US012490794B2

(12) United States Patent
Gonzalez de los Santo et al.

(10) Patent No.: US 12,490,794 B2
(45) Date of Patent: Dec. 9, 2025

(54) TEXTILES AND METHODS OF MAKING THE SAME

(71) Applicant: NIKE, Inc., Beaverton, OR (US)

(72) Inventors: Eduardo Alberto Gonzalez de los Santo, Beaverton, OR (US); David M. Litton, Portland, OR (US); Romesh Patel, Beaverton, OR (US); Christopher J. Ranalli, Portland, OR (US); Joshua Patrick Williams, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/480,630

(22) Filed: Oct. 4, 2023

(65) Prior Publication Data
US 2024/0090604 A1 Mar. 21, 2024

Related U.S. Application Data

(63) Continuation of application No. 16/493,090, filed as application No. PCT/US2018/022330 on Mar. 14, 2018, now Pat. No. 11,812,807.
(Continued)

(51) Int. Cl.
*A41D 31/12* (2019.01)
*A41D 1/00* (2018.01)
(Continued)

(52) U.S. Cl.
CPC .............. *A41D 31/12* (2019.02); *A41D 1/00* (2013.01); *D01D 5/22* (2013.01); *D01D 5/253* (2013.01);
(Continued)

(58) Field of Classification Search
None
See application file for complete search history.

(56) References Cited

U.S. PATENT DOCUMENTS 3,359,610 A * 12/1967 Faircloth ................ D03D 11/02
139/421
4,117,194 A 9/1978 Barbe et al.
(Continued)

FOREIGN PATENT DOCUMENTS

CN 1768171 A 5/2006
CN 101031679 A 9/2007
(Continued)

OTHER PUBLICATIONS

Machine Trasnlation of JP2009228141 (Year: 2009).*
(Continued)

*Primary Examiner* — Shawn Mckinnon
(74) *Attorney, Agent, or Firm* — Shook, Hardy & Bacon L.L.P.

(57) ABSTRACT

Various aspects disclosed relate to structure such as a textile, a garment, a garment component, footwear, or a footwear component. The present disclosure includes the structure having a first region having one of more first fibers. An individual first fiber includes co-extruded first and second filaments, the first filament formed of a first thermoplastic polymeric material. Due to expansion or contraction of the one or more first fibers, the first region contracts or expands on a change in relative humidity, relative to an equilibrium state of the first region prior to the change in relative humidity.

9 Claims, 24 Drawing Sheets

Related U.S. Application Data

(60) Provisional application No. 62/472,817, filed on Mar. 17, 2017, provisional application No. 62/472,795, filed on Mar. 17, 2017.

(51) Int. Cl.

| | | |
|---|---|---|
| *D01D 5/22* | (2006.01) | |
| *D01D 5/253* | (2006.01) | |
| *D01D 5/32* | (2006.01) | |
| *D01F 8/12* | (2006.01) | |
| *D01F 8/14* | (2006.01) | |
| *D02G 1/18* | (2006.01) | |
| *D02G 3/04* | (2006.01) | |
| *D03D 15/37* | (2021.01) | |
| *D03D 15/567* | (2021.01) | |
| *D04H 1/541* | (2012.01) | |
| *D04H 3/018* | (2012.01) | |

(52) U.S. Cl.
CPC ............... *D01D 5/32* (2013.01); *D01F 8/12* (2013.01); *D01F 8/14* (2013.01); *D02G 1/18* (2013.01); *D02G 3/045* (2013.01); *D03D 15/37* (2021.01); *D03D 15/567* (2021.01); *D04H 1/541* (2013.01); *D04H 3/018* (2013.01); *D10B 2401/02* (2013.01); *D10B 2403/0213* (2013.01)

(56) References Cited

U.S. PATENT DOCUMENTS

| | | |
|---|---|---|
| 5,108,820 A | 4/1992 | Kaneko et al. |
| 6,447,902 B1 | 9/2002 | Carter et al. |
| 2006/0210793 A1 | 9/2006 | Yamada |
| 2008/0132133 A1 | 6/2008 | Yasui et al. |
| 2011/0099680 A1 | 5/2011 | Gordon |
| 2012/0128975 A1 | 5/2012 | Ueda et al. |
| 2013/0260129 A1* | 10/2013 | Agzikara ............... D01H 5/70 428/221 |

FOREIGN PATENT DOCUMENTS

| | | | |
|---|---|---|---|
| CN | 101967713 A | | 2/2011 |
| CN | 104395048 A | | 3/2015 |
| JP | 62-057921 A | | 3/1987 |
| JP | S6257921 A | | 3/1987 |
| JP | H0376818 A | | 4/1991 |
| JP | H07216736 A | | 8/1995 |
| JP | 2002180323 A | | 6/2002 |
| JP | 2003041462 A | | 2/2003 |
| JP | 2009019310 A | | 1/2009 |
| JP | 2009114581 | * | 5/2009 |
| JP | 2009228141 | * | 10/2009 |

OTHER PUBLICATIONS

Machine Translation of JP2009114581 (Year: 2009).*
International Search Report and Written Opinion for PCT/US2018/022330 mailed May 25, 2018.
Office Action received for European Application No. 18768010.3, mailed on Nov. 13, 2024, 8 pages.
Office Action received for European Application No. 18768010.3, mailed on Oct. 17, 2023, 3 pages.
Office Action received for European Application No. 18768010.3, mailed on Apr. 8, 2025, 4 pages.

* cited by examiner

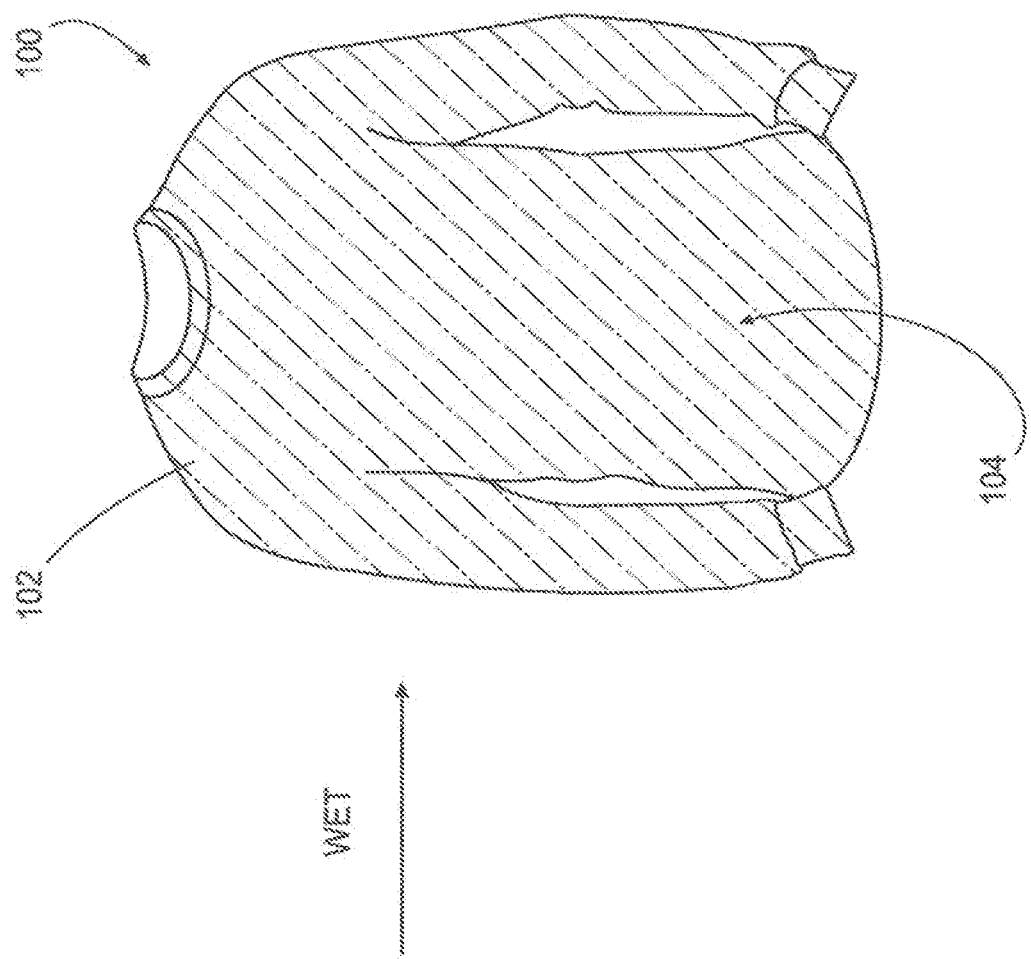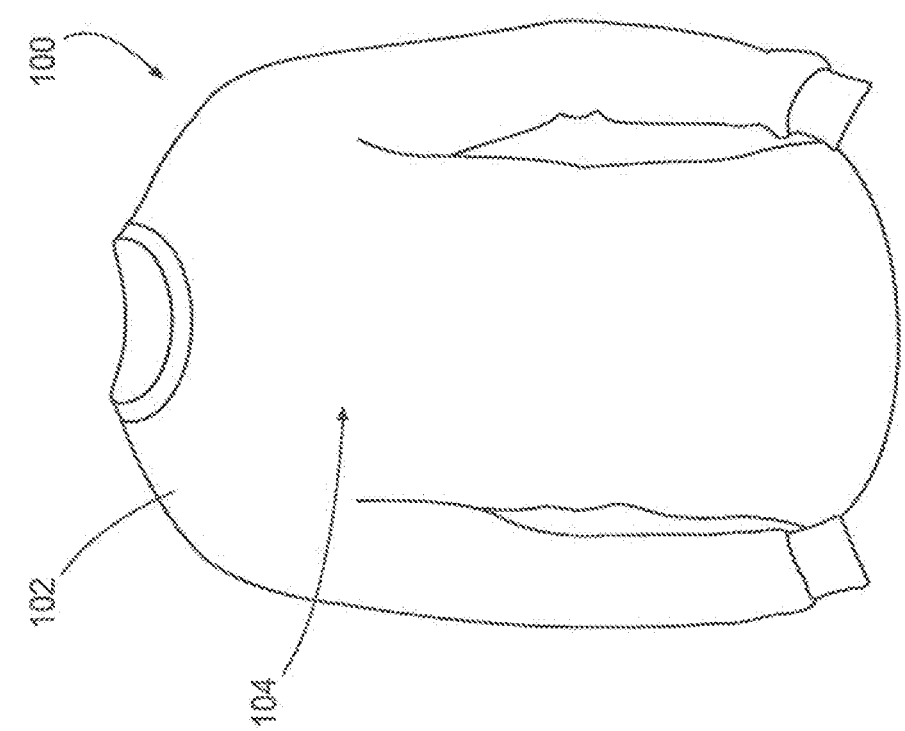
FIG. 1A

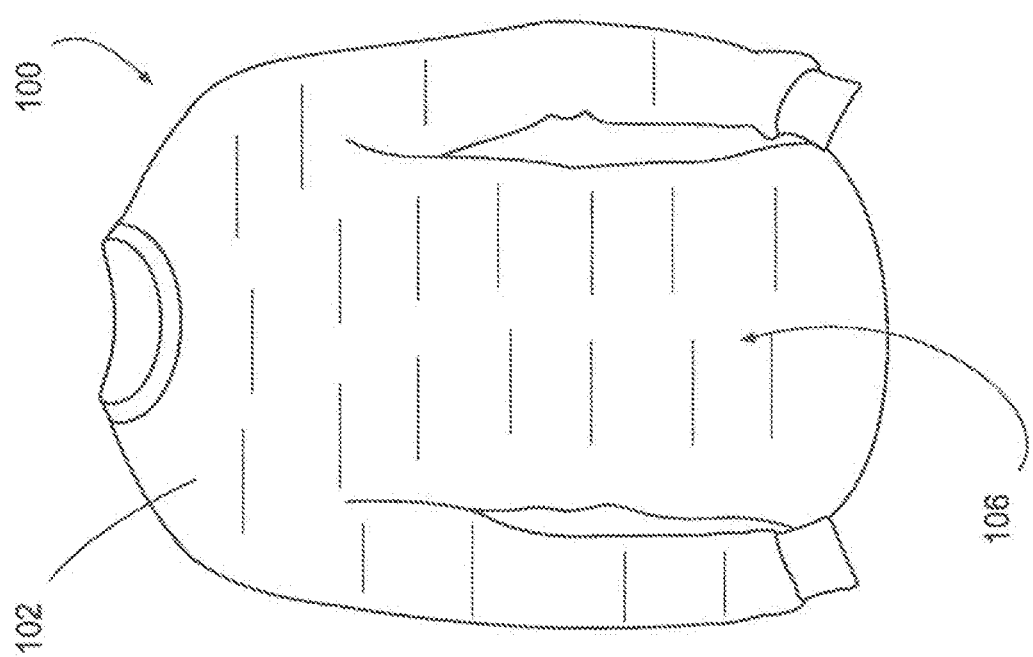
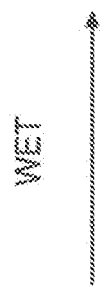
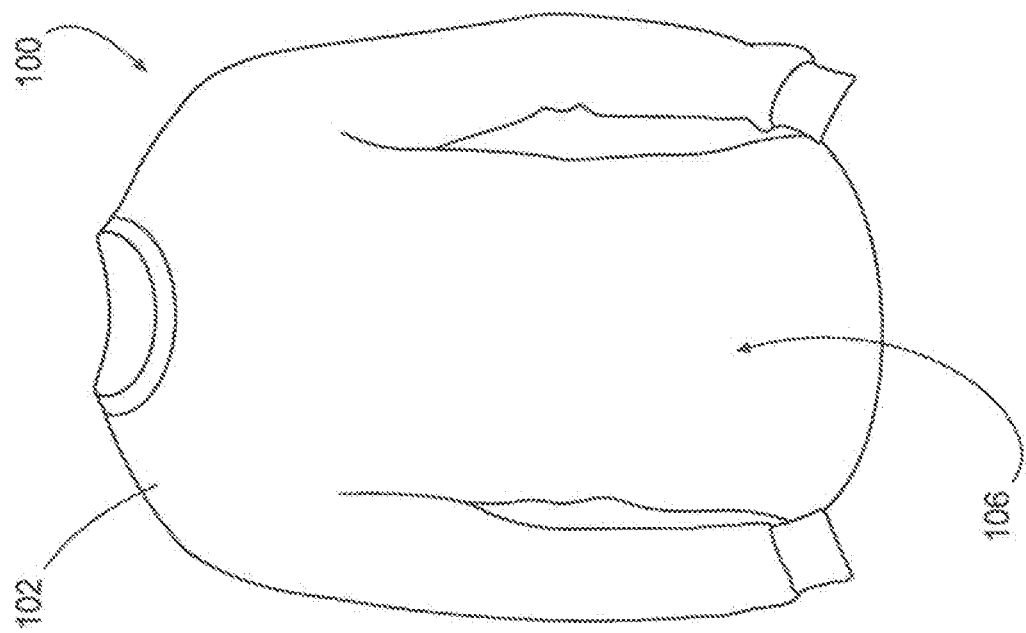
FIG. 1B

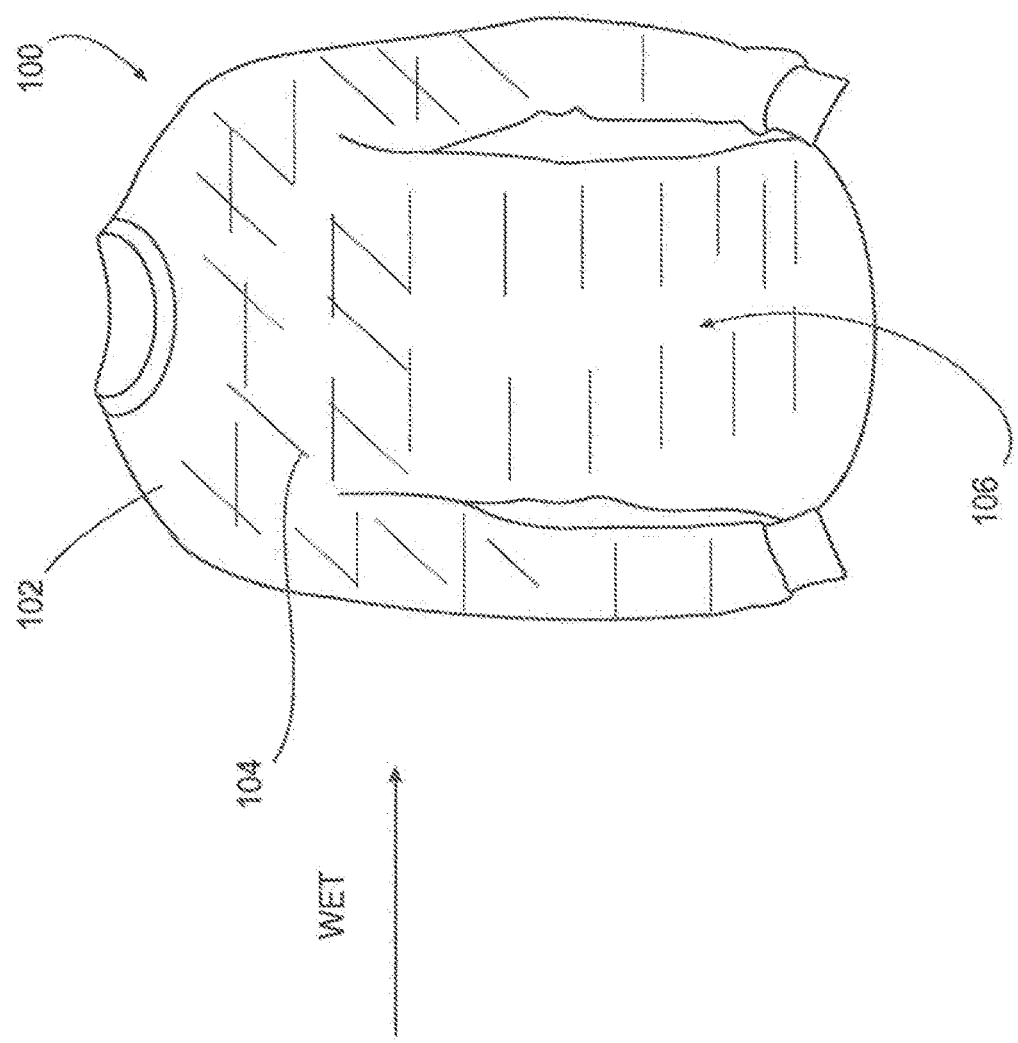
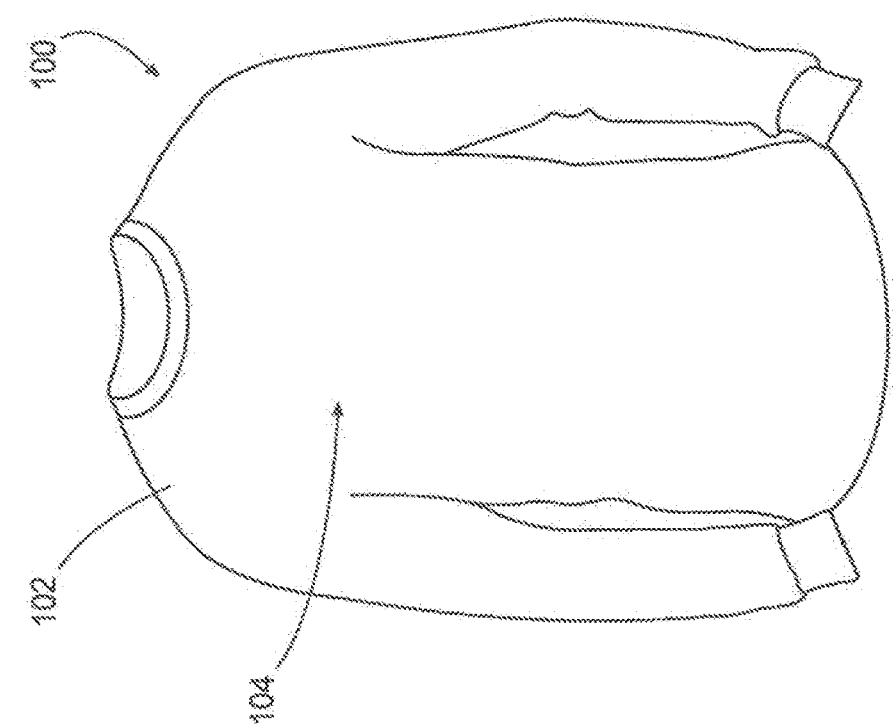
FIG. 1C

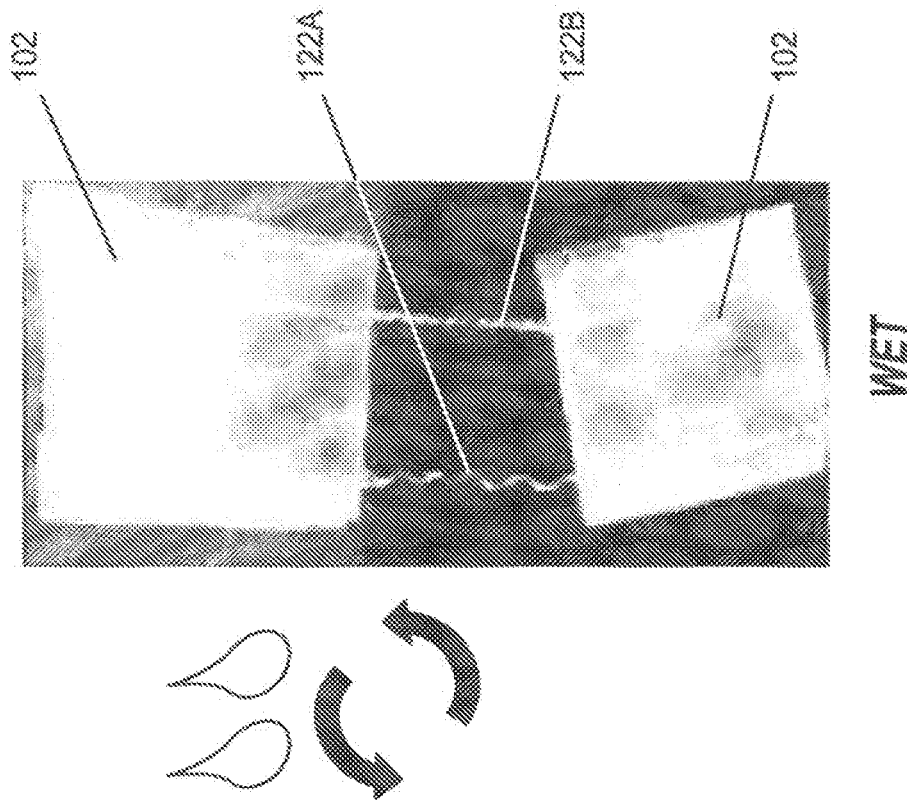
FIG. 9B WET
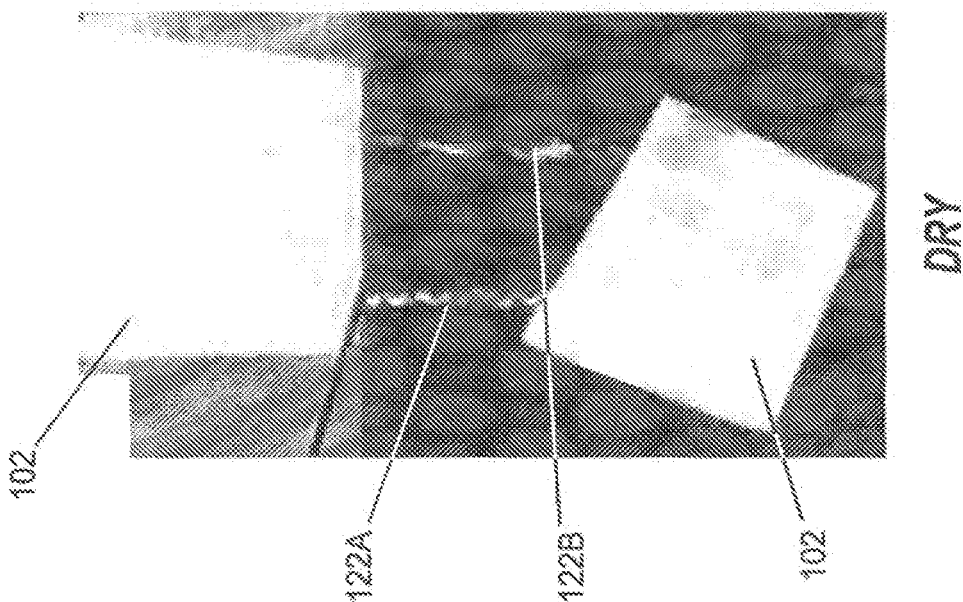
FIG. 9A DRY

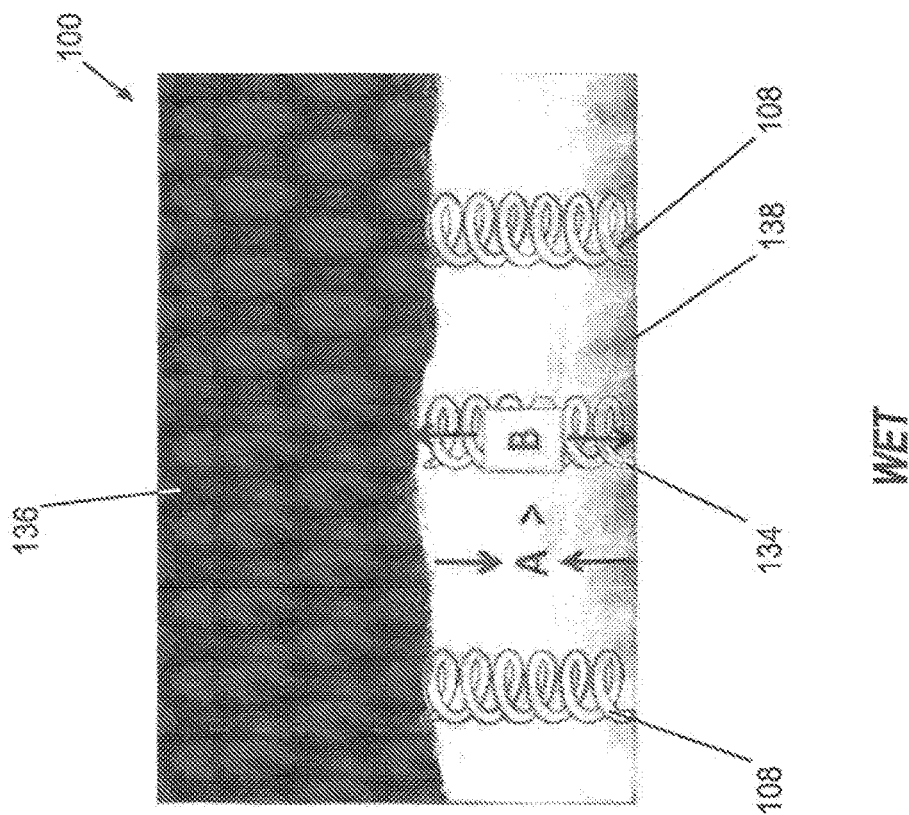
FIG. 10B WET
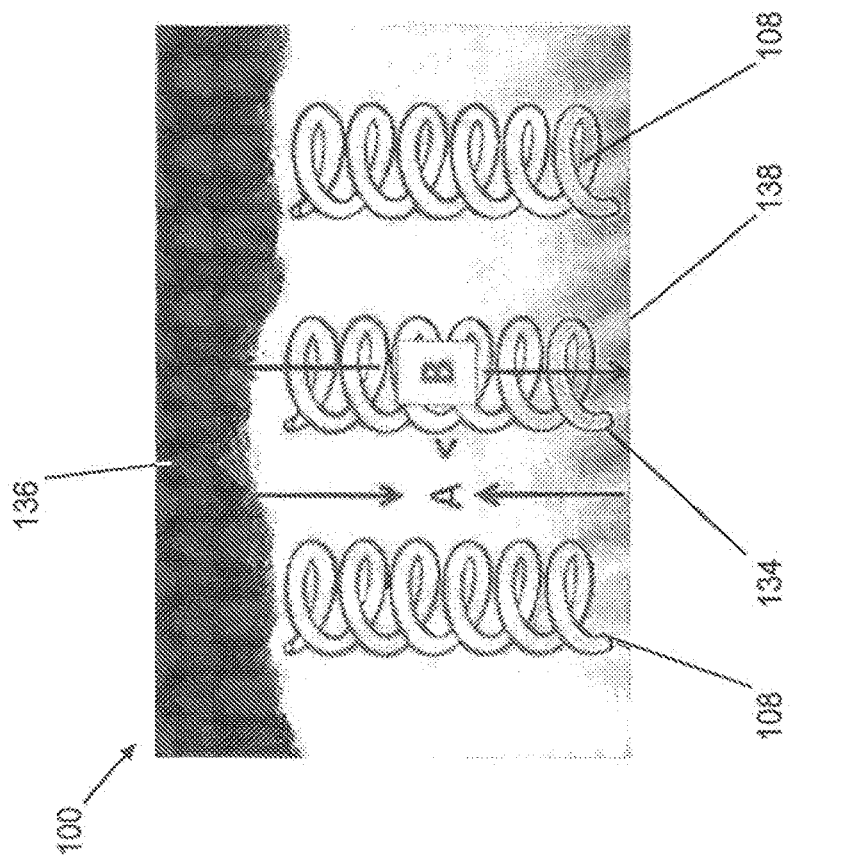
FIG. 10A DRY

TEXTILES AND METHODS OF MAKING THE SAME

CROSS-REFERENCE TO RELATED APPLICATIONS

This application is a continuation of U.S. patent application Ser. No. 16/493,090, having the title "TEXTILES AND METHODS OF MAKING THE SAME", filed Sep. 11, 2019, which is the 35 U.S.C. § 371 national stage application of PCT Application No. PCT/US2018/022330, having the title "TEXTILES AND METHODS OF MAKING THE SAME", filed Mar. 14, 2018, where the PCT claims priority to and the benefit of, U.S. Provisional Application Ser. No. 62/472,795, having the title "TEXTILE MATERIAL AND METHODS OF MAKING THE SAME", filed on Mar. 17, 2017, and also claims the benefit to and priority of U.S. Provisional Application Ser. No. 62/472,817, having the title "GARMENTS, GARMENT COMPONENTS, FOOTWEAR, OR FOOTWEAR COMPONENTS AND METHODS OF MAKING THE SAME", filed on Mar. 17, 2017, the disclosures of which are incorporated herein by reference in their entireties.

BACKGROUND

During the course of physical activity, a user of an article such as a garment or footwear may undergo changes in their perspiration level. Typically a change in the user's perspiration level is due to the user's body trying to remove or retain heat. In order to remain comfortable, the user may change, for example, a garment. This is because some garments are better suited to retain heat while other garments are better suited to help remove heat. The characteristics of the garments in relation to their ability to retain or remove heat can be a function of the structure and material of the fibers forming the garment.

BRIEF DESCRIPTION OF THE DRAWINGS

Further aspects of the present disclosure will be more readily appreciated upon review of the detailed description of its various aspects, described below, when taken in conjunction with the accompanying drawings.

The drawings illustrate only example aspects and are therefore not to be considered limiting of the scope described herein, as other equally effective aspects are within the scope and spirit of this disclosure. The elements and features shown in the drawings are not necessarily drawn to scale, emphasis instead being placed upon clearly illustrating the principles of the aspects. Additionally, certain dimensions may be exaggerated to help visually convey certain principles. In the drawings, similar reference numerals between figures designate like or corresponding, but not necessarily the same, elements.

FIGS. 1A-1C are plan views of a garment incorporating a textile, in accordance with various aspects.

FIGS. 9A and 9B are schematic views of some aspects of the textile including adjacent heat treated and untreated yarns, respectively, in accordance with various aspects.

FIGS. 10A and 10B are schematic depictions of a garment including the fibers in a contracted or expanded state, in accordance with various aspects.

DETAILED DESCRIPTION

Figure 2A:
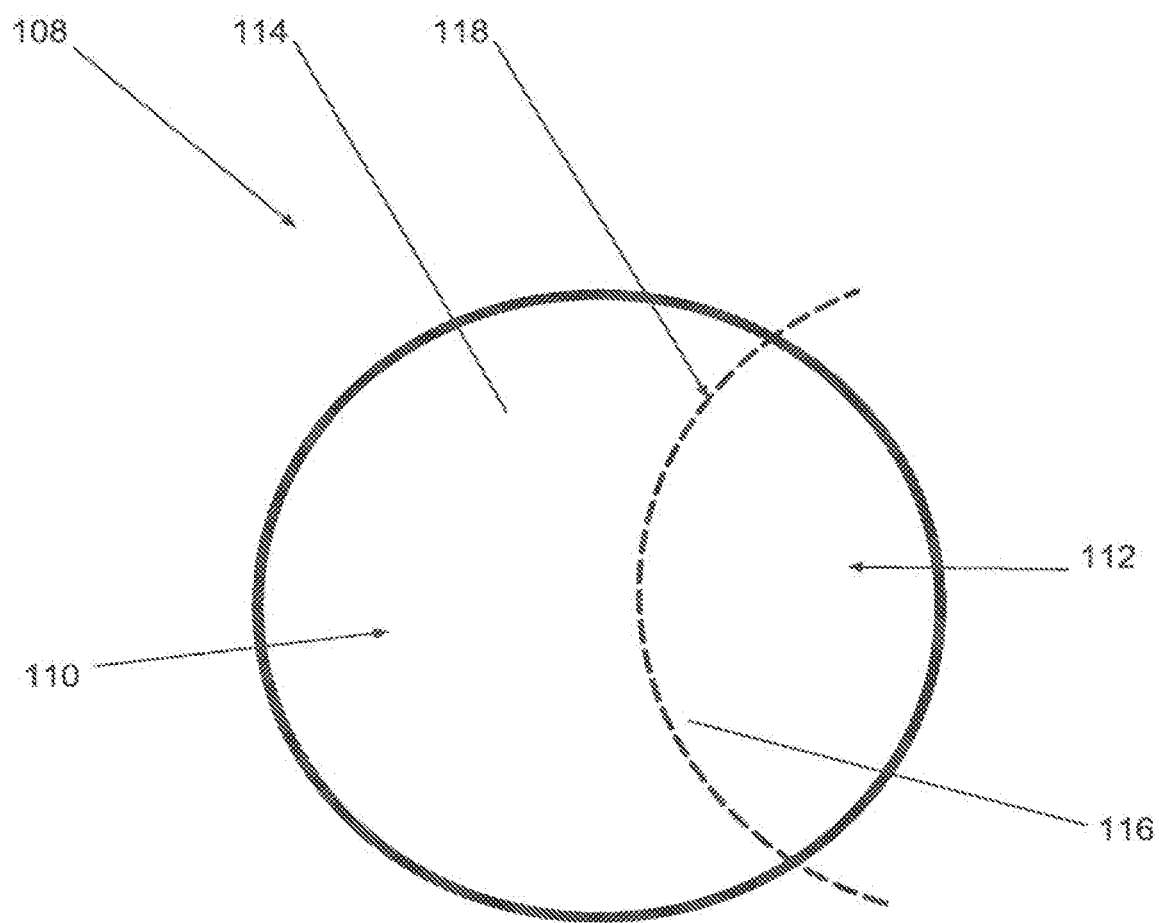
FIGS. 2A-2H are end views of different examples of a fiber of the textile, in accordance with various aspects.
Figure 2B:
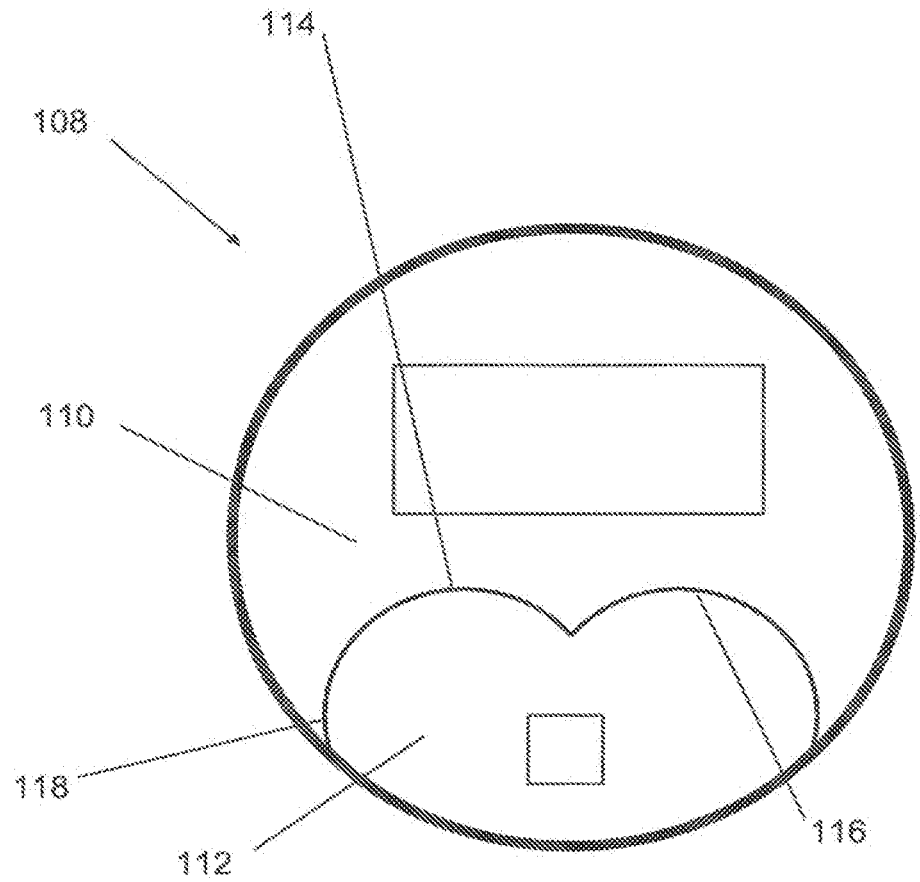

The present disclosure provides for a textile or article including a textile (e.g. garment, garment component, footwear, or footwear including a textile) that can undergo a mechanical change in response to a moisture stimulus that can be generated, for example, by a user's perspiration. The mechanical change can include a shape change of the textile or article. The shape change can result from a contraction or expansion of the individual fibers that form the textile. For example, the individual fibers can be configured to either expand or contract in at least one of a length %, width %, and length % and width %. The expansion or contraction can be triggered by the moisture stimulus generated by the user.

Expansion or contraction of the individual fibers can be adapted to occur upon a predetermined perspiration level of the user. Upon expansion or contraction of the individual fibers the shape of the textile can change to be better suited to the user's condition. For example, the textile can alternate between a lofty structure, to retain heat, and a less lofty or substantially flat structure, to help remove heat.

In an aspect, the textile comprises: a first region of the textile comprising one or more first fibers, an individual first fiber having a length at least 10 times greater than a width of the individual first fiber, the individual first fiber comprising co-extruded first and second filaments, the first filament formed of a first thermoplastic polymeric material, the co-extruded first and second filaments having an interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity. In another aspect, an article including the textile is provided.

In an aspect, the first and second filaments are substantially laminated to each other at the interface along the majority of the length of the individual first fiber. In an aspect, the first fiber has the characteristic that it will contract upon a change in relative humidity of at least 10% over a range of about 30% relative humidity to about 100% relative humidity, relative to an equilibrium state of the first region prior to the change in relative humidity.

In an aspect, the first and second filaments are substantially delaminated at the interface along the majority of the length of the individual first fiber. In an aspect, the first fiber has the characteristic that it will expand upon a change in relative humidity of at least 10% over a range of about 30% relative humidity to about 100% relative humidity, relative to an equilibrium state of the first region prior to the change in relative humidity.

In an aspect, the interface defines an interior surface of the individual first fiber, an exterior surface of the individual first fiber defined by a portion of the first filament along a majority of the length of the individual first fiber and by a portion of the second filament along the majority of the length of the individual first fiber.

In an aspect, the first filament has a cross section including a concave surface and the second filament formed of a second thermoplastic polymeric material and having a cross section including a convex surface.

In an aspect, the co-extruded first and second filaments have the interface at which the concave surface of the first filament directly contacts and partially envelops the convex surface of the second filament.

In an aspect, the second filament formed of a second thermoplastic polymeric material, wherein the interface at which the concave surface of the first filament directly contacts and fully envelops the convex surface of the second filament.

According to various aspects, the present disclosure provides the textile as described above and herein included in a garment, a garment component, footwear, or a footwear component.

In an aspect, a method of forming a textile comprising: forming a textile from one or more first fibers, an individual first fiber having a length at least 10 times greater than a width of the individual first fiber, the individual first fiber comprising co-extruded first and second filaments, the first filament formed of a first thermoplastic polymeric material, the co-extruded first and second filaments having an interface at which the first filament directly contacts the second filament, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity incorporating the textile into a garment, a garment component, footwear, or a footwear component.

Before additional details of the present disclosure are described in greater detail, it is to be understood that this disclosure is not limited to particular aspects described, and as such may, of course, vary. It is also to be understood that the terminology used herein is for the purpose of describing particular aspects only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual aspects described and illustrated herein has discrete components and features which may be readily separated from or combined with the features of any of the other several aspects without departing from the scope or spirit of the present disclosure. Any recited method can be carried out in the order of events recited or in any other order that is logically possible.

Aspects of the present disclosure will employ, unless otherwise indicated, techniques of chemistry, textiles, and the like, which are within the skill of the art.

The following examples are put forth so as to provide those of ordinary skill in the art with a complete disclosure and description of how to perform the methods and use the textiles and methods disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the aspects of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular aspects only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

General Discussion

Reference will now be made in detail to certain aspects of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

It can be desirable to develop articles, according to this disclosure, that include textiles capable of undergoing a change in shape triggered at least in part, by an external moisture stimulus such as user's perspiration. This can allow the textile or the article to adapt in substantially real time to a user's condition. This can increase performance of the article and increase comfort of the article to the user, which can thereby increase the user's athletic performance and the user's level of comfort. As a non-limiting example, the ability of a garment incorporating the textile to adapt as described herein, can reduce the need for a user to shed or add layers during a workout. This is because the article itself, through the textile, can adapt to appropriately provide more or less insulation to the user.

The present disclosure relates generally to a textile material and articles including a textile material, according to the various aspects described herein, which undergoes a mechanical change in response to an external moisture stimulus. An external moisture stimulus can be the presence or absence of moisture that contacts the textile material. The external moisture stimulus can be provided, for example, by perspiration or through the humidity of the environment surrounding the textile. The mechanical change can be a reversible contraction or expansion of the textile. The textile material can be formed from a plurality of fibers including at least one bi-component fiber that can be tuned to contract or expand thus resulting in a mechanical change or shape change such as contraction or expansion of the textile. The textile can be incorporated into a garment (e.g., a shirt or pants), a garment component (e.g., a patch or vent), footwear (e.g., a shoe or a sock), or a footwear component (e.g., a lace or upper). In some examples, the textile defines the garment, garment component, footwear, or footwear component entirely. In other examples, the textile can define only a portion of the garment, garment component, footwear, or footwear component.

The ability of the textile material to undergo a mechanical change in response to an external moisture stimulus can allow the textile to adapt in response to a user's physiological condition, such that, for example, the textile of the various aspects described herein can expand or contract in response to a triggering event in which the external moisture stimulus exceeds or falls below a threshold value. The external moisture stimulus can exceed or fall below the threshold value, for example, through change in the user's perspiration level or a change in the relative humidity in the textile's immediate environment.

This behavior of the textile can help to selectively increase or decrease the loft of the garment in response to the user's level of perspiration. The loft is the density of fiber in a textile as related to the thickness; the higher the loft of a textile, the thicker it is respective to its density. For example, in a garment, increased loft can result in more air being trapped between the user and the garment, whereas less loft can result in less air being trapped between the user and the garment. More loft, and thus more insulation, can be desirable for a user when the user is generating less perspiration. In this circumstance, the user's body is not attempting to remove heat to a great extent. Conversely, less loft, and thus less insulation, can be desirable for a user when the user is generating more perspiration. In this circumstance, the user's body is attempting to remove heat. The less lofty structure can decrease the insulation and possibly increase wicking of the perspiration from the user, thus resulting in, e.g., a cooling effect to the user.

FIGS. 1A, 1B, and 1C are plan views of a garment 100 incorporating a textile 102 according to the present disclosure. FIGS. 1A, 1B, and 1C show many of the same components and will be discussed concurrently. As shown, the garment 100 is a shirt. A shirt is one non-limiting example of a suitable garment. Additional, non-limiting examples of garments include socks, pants, gloves, wristbands, headbands, hats, underlayers, and undergarments.

As shown in FIGS. 1A-1C, 100% of the surface area of the garment 100 is defined by the textile 102. In other examples, the textile 102 may define less than 100% of the surface area of the textile 102. For example, the textile 102 can define about 1% to about 99% of the surface area of the garment 100, or about 5% to about 95%, about 10% to about 90%, about 15% to about 85%, about 20% to about 80%, about 25% to about 75%, about 30% to about 70%, about 35% to about 65%, about 40% to about 60%, or about 45% to about 55% of the surface area of the garment 100.

FIG. 1A shows region 104 fully contracted. FIG. 1B shows region 104 fully contracted. FIG. 1C shows a region 104 of contraction and a region 106 of expansion. A first region 104 of the textile 102 is adapted to undergo a mechanical change in response to an external moisture stimulus. For example, when exposed to moisture levels above or below a certain threshold value, the first region 104 can change shapes. For example, the first region 104 can contract (indicated by the diagonal lines), as shown in FIGS. 1A and 1C, or expand (indicated by the horizontal lines) as shown in FIG. 1B. Other mechanical changes can include the first region 104 adapting a lofty structure or a flat structure. Additionally, in response to an external moisture stimulus, a vent (not shown) in the textile 102 may be opened or closed.

The first region 104 can range from about 5% to about 100% of a total surface area of the textile 102, or from about 10% to about 95%, about 15% to about 90%, about 20% to about 85%, about 25% to about 80%, about 30% to about 75%, about 35% to about 70%, about 40% to about 65%, about 45% to about 60%, or about 50% to about 55% of the total surface area of the textile. The size of the first region 104 can depend on the type of article to which the textile 102 is incorporated. For example, the first region 104 can range from about 0.05 mm$^2$ to about 10 mm$^2$, about 1.0 mm$^2$ to about 9.5 mm$^2$, about 1.5 mm$^2$ to about 9.0 mm$^2$, about 2 mm$^2$ to about 8.5 mm$^2$, about 2.5 mm$^2$ to about 8.0 mm$^2$, about 3.0 mm$^2$ to about 7.5 mm$^2$, about 3.5 mm$^2$ to about 7.0 mm$^2$, about 4.0 mm$^2$ to about 6.5 mm$^2$, about 4.5 mm$^2$ to about 6.0 mm$^2$, or about 5.0 mm$^2$ to about 5.5 mm$^2$. Additionally, the first region 104 can range from about 5 wt % to about 100 wt % of a total surface area of the textile 102, or from about 10 wt % to about 95 wt %, about 15 wt % to about 90 wt %, about 20 wt % to about 85 wt %, about 25 wt % to about 80 wt %, about 30 wt % to about 75 wt %, about 35 wt % to about 70 wt %, about 40 wt % to about 65 wt %, about 45 wt % to about 60 wt %, or about 50 wt % to about 55 wt %, of the total surface area of the textile 102.

In some examples, a second region 106 of the textile 102 is adapted to contract if the first region 104 expands, or is adapted to expand if the first region 104 contracts. This is shown in FIG. 10. The second region can range from about 5% to about 95% of a total surface area of the textile 102, or from about 10% to about 90%, about 15% to about 85%, about 20% to about 80%, about 25% to about 75%, about 30% to about 70%, about 35% to about 65%, about 40% to about 60%, or about 45% to about 55% of the total surface area of the textile. Similar to the size of the first region 104, the size of the second region 106 can depend on the type of article to which the textile 102 is incorporated. For example, the first region 104 can range from about 0.05 mm$^2$ to about 10 mm$^2$, about 1.0 mm$^2$ to about 9.5 mm$^2$, about 1.5 mm$^2$ to about 9.0 mm$^2$, about 2 mm$^2$ to about 8.5 mm$^2$, about 2.5 mm$^2$ to about 8.0 mm$^2$, about 3.0 mm$^2$ to about 7.5 mm$^2$, about 3.5 mm² to about 7.0 mm², about 4.0 mm² to about 6.5 mm², about 4.5 mm² to about 6.0 mm², or about 5.0 mm² to about 5.5 mm².

In some examples, in response to the moisture stimulus, the first region 104 or the second region 106 expands or contracts by at least 1 length %, at least 1 width % or at least 1 length % and at least 1 width % relative to a resting state. In some examples, the first region 104 or the second region 106 expands or contracts from about 1 length % to about 50 length %, about 5 length % to about 45 length %, about 10 length % to about 40 length %, about 15 length % to about 35 length %, or about 20 length % to about 30 length %. In some examples, the first region 104 or the second region 106 expands or contracts from about 1 width % to about 50 width %, about 5 width % to about 45 width %, about 10 width % to about 40 width %, about 15 width % to about 35 width %, or about 20 width % to about 30 width %. In some further examples, the first region 104 or the second region 106 expands or contracts from about 1 length % and width % to about 50 length % and width %, about 5 length % and width % to about 45 length % and width %, about 10 length % and width % to about 40 length % and width %, about 15 length % and width % to about 35 length % and width %, or about 20 length % and width % to about 30 length % and width %.

The mechanical change of the textile 102 occurs through an external moisture stimulus, such as a change in relative humidity above a threshold value. For example, the mechanical change can be triggered upon a change in relative humidly ranging from about 10% to about 50%, about 15% to about 45%, about 20% to about 40%, or about 25% to about 35%. The change in relative humidity is measured over a range from about 30% relative humidity to about 100% relative humidity. The expansion or contraction of the textile 102 is relative to an equilibrium or resting state of the first region 104 or the second region 106 prior to the change in relative humidity. The textile 102 is able to revert back to the equilibrium state when the humidity or moisture level falls below the threshold level. In some examples, the temperature that the textile 102 is exposed to can also affect to the degree to which the textile 102 expands or contracts relative to the resting state.

At least one portion of the textile 102 is formed from bi-component fibers. The mechanical change of the textile 102 is driven, at least in part or in total, by one or more first fibers 108 included (e.g., woven, entangled, or knitted) therein. FIGS. 2A and 2I show various examples of an individual first fiber 108. FIGS. 2A-2H are end views of the various examples of the first fiber 108. FIG. 2I is a partial perspective view of the first fiber 108 shown in FIG. 2A. The first fiber 108 is a bi-component fiber including a co-extruded first filament 110 and second filament 112. A length L of the first fiber 108 ranges from about 10 to about 100 times greater than a width W of the first fiber 108, from about 15 times to about 95 times, about 20 times to about 90 times, about 25 times to about 85 times, about 30 times to about 80 times, about 35 times to about 75 times, about 40 times to about 70 times, about 45 times to about 65 times, or about 50 times to about 60 times greater than a width of the first fiber 108.

The first filament 110 and the second filament 112 include respective first and/or second thermoplastic polymeric materials. In some aspects, as shown in FIG. 2A, the first filament 110 has a generally circular cross section including a concave surface 114. The second filament 112 also has a generally circular cross section including a convex surface 116. But those skilled in the art will recognize that the first fiber 108 can have other cross sectional shapes or features.

Figure 2C:
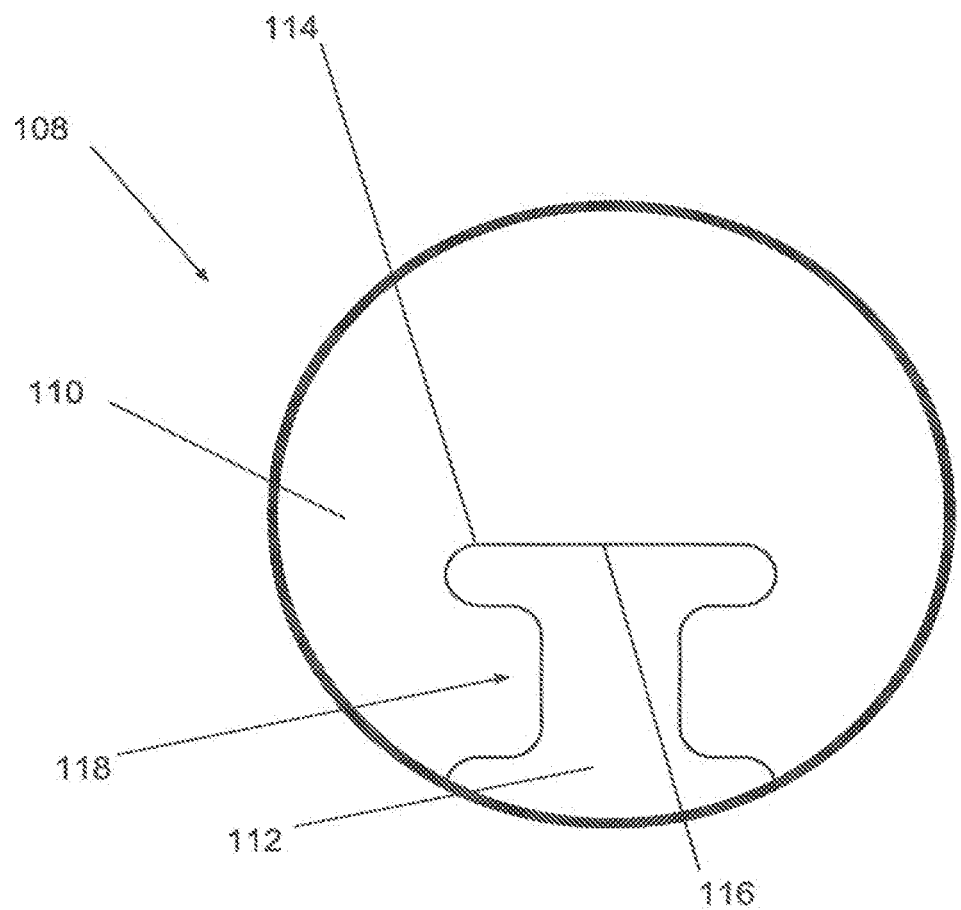
Figure 2D:
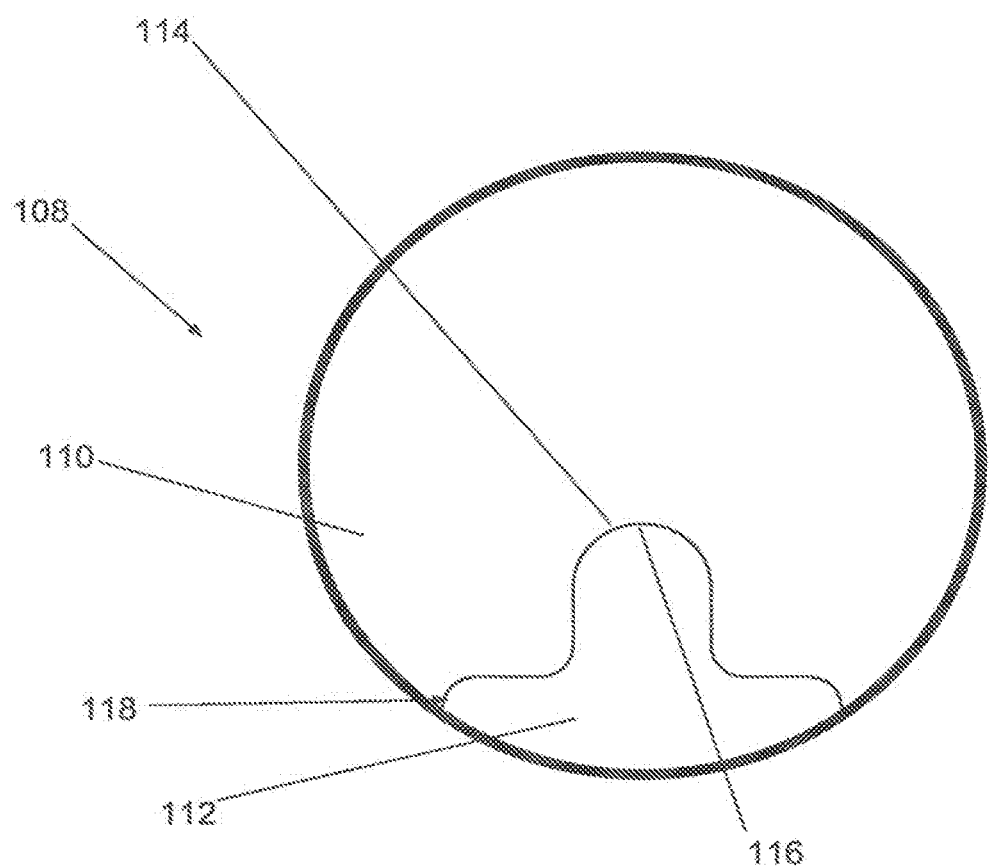
Figure 2E:
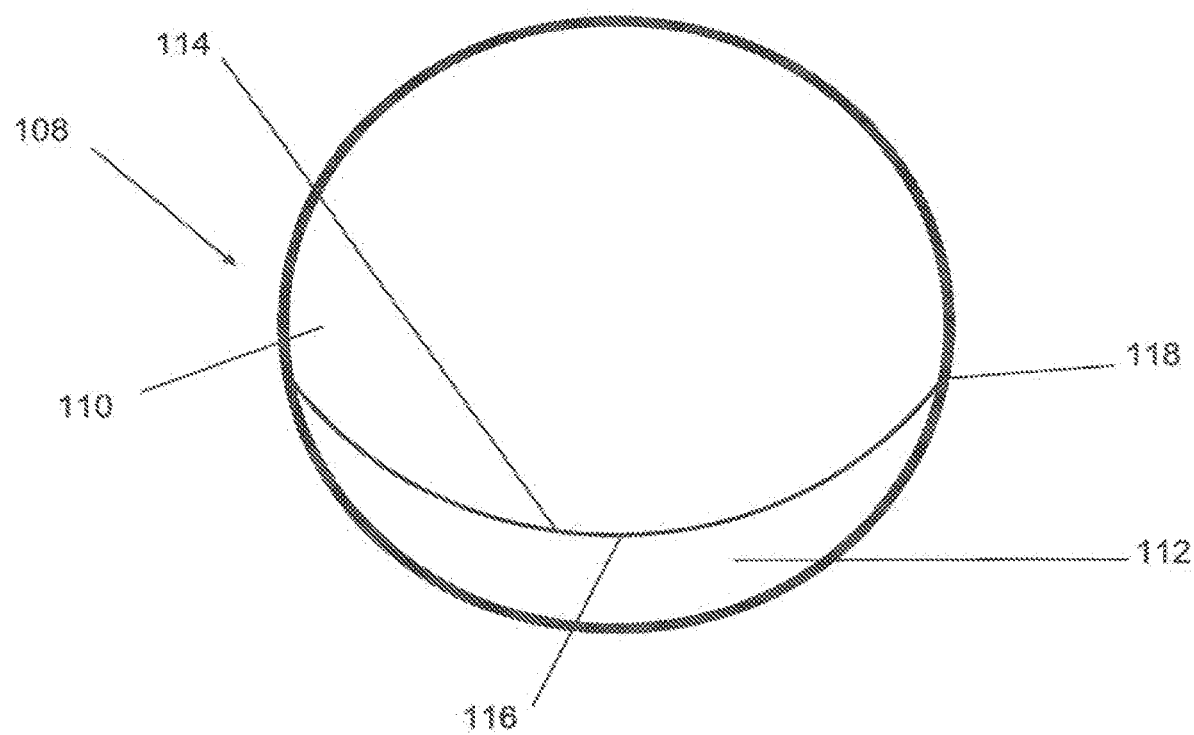
Figure 2F:
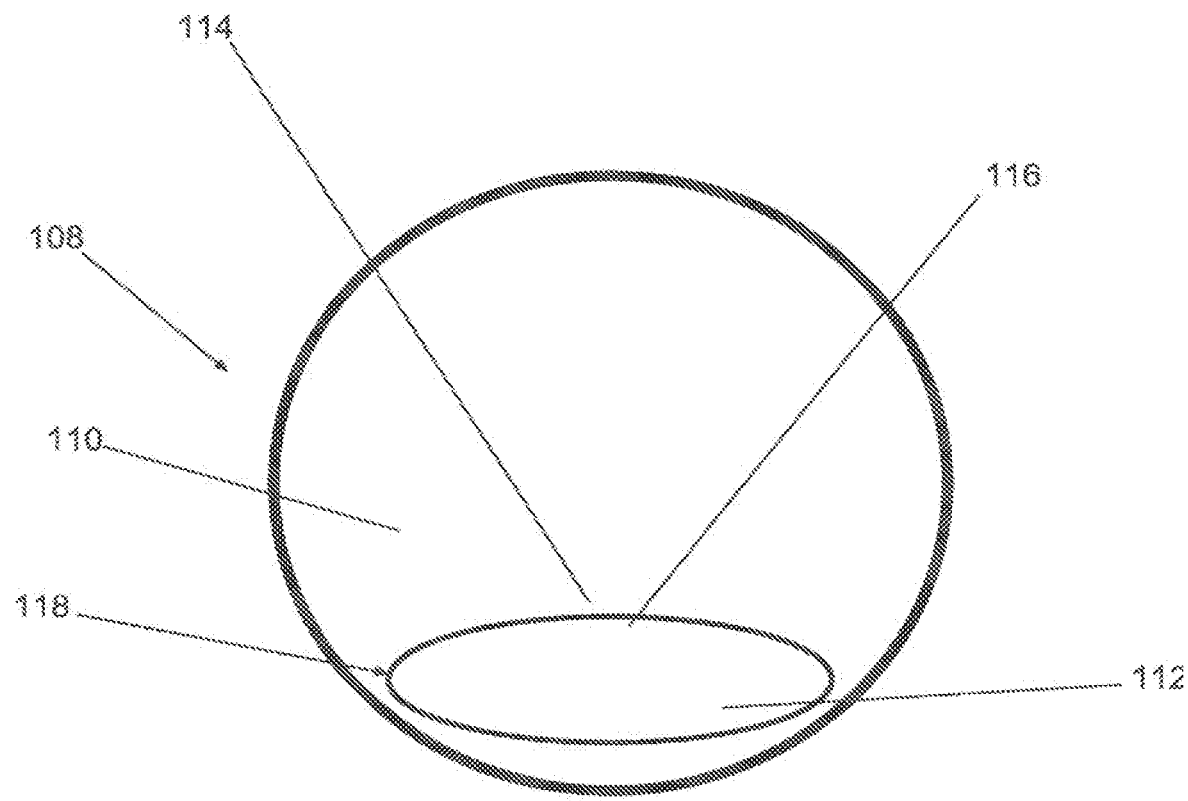
Figure 2G:
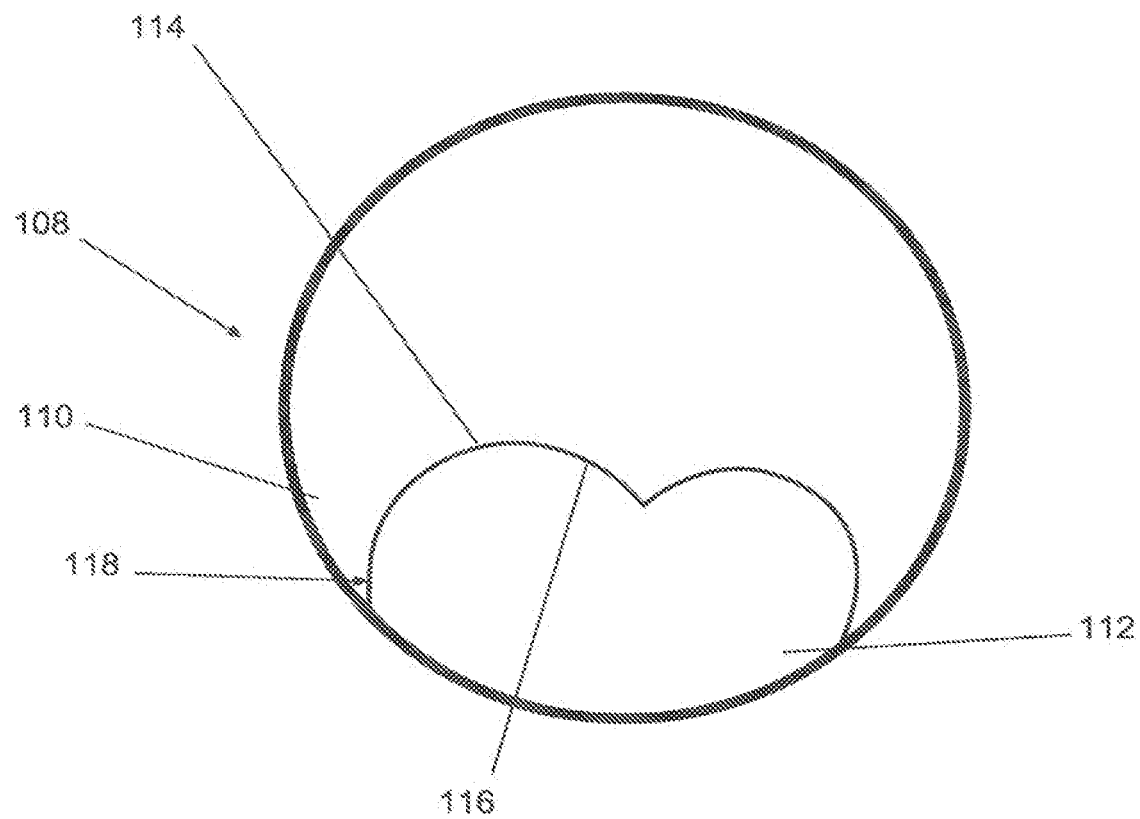
Figure 2H:
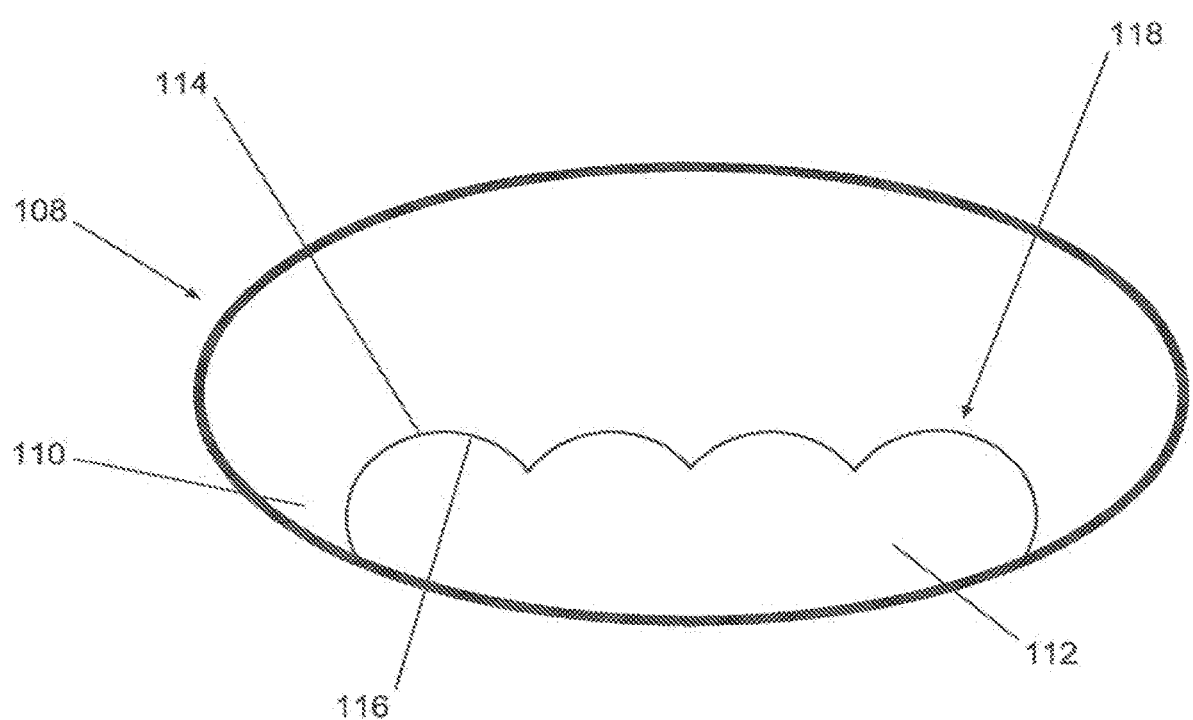
Figure 2I:
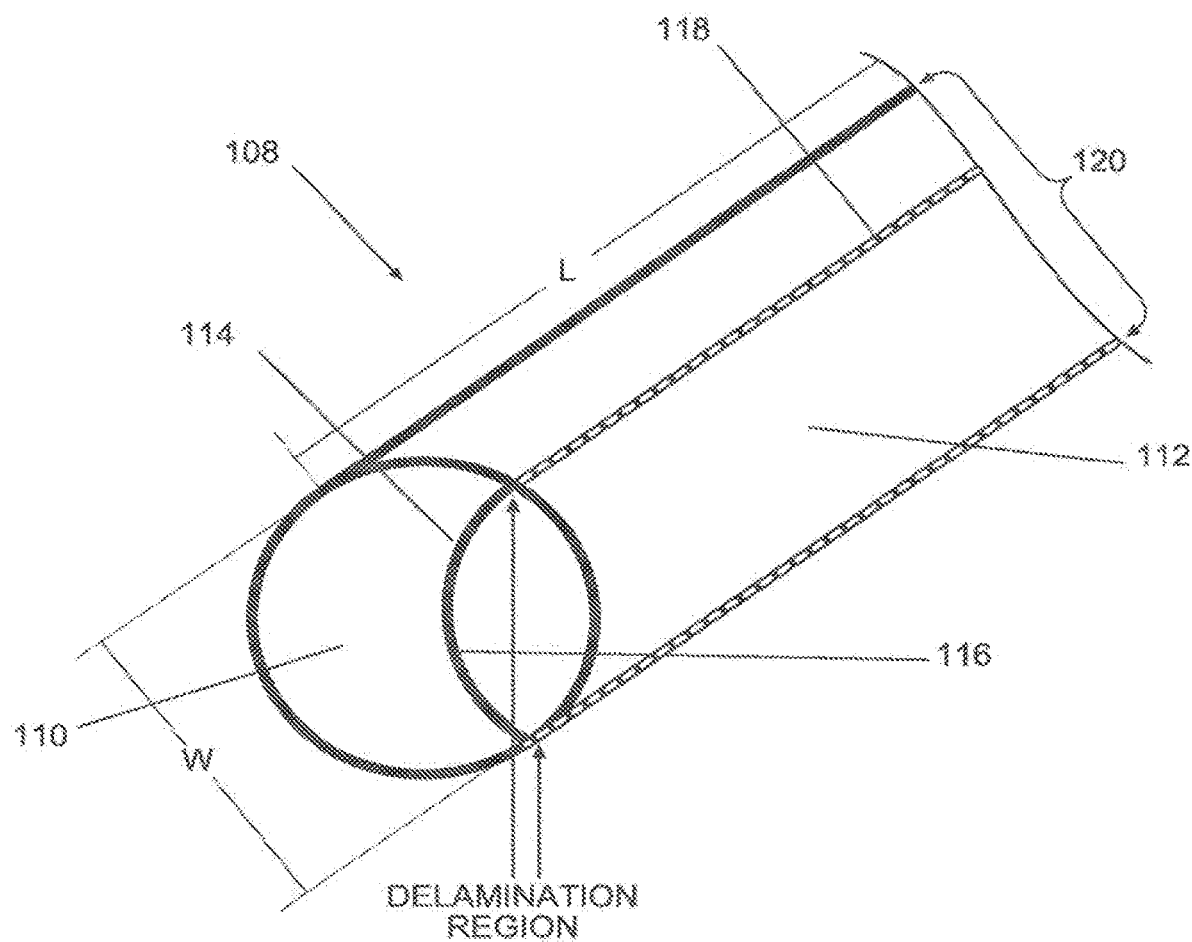
FIG. 2I is a perspective view of the fiber of FIG. 2A, in accordance with various aspects.

For example, first filament 110 or the second filament 112 can include more than one convex surface 116 or concave surface 114 as shown in FIGS. 2B, 2C, 2D, 2E, 2G and 2H. Additionally, the cross section of either or both of the first filament 110 or the second filament 112 can have a generally oval shape, as shown in FIGS. 2F and 2H. The cross section of either or both of the first filament 110 or the second filament 112 can have a crescent shape as shown in FIG. 2E. The cross section of either or both of the first filament 110 or the second filament 112 can also include a projection as shown in FIGS. 2C and 2D.

An interface 118 defines an interior surface of the first fiber 108. At the interface 118, a surface of the first filament 110 and a surface of the second filament 112 directly contact each other. As shown, for example, in FIGS. 2A and 2I, the direct contact between the first filament 110 and the second filament 112 is facilitated by the concave surface 114 at least partially enveloping the convex surface 116. In some examples of the individual first fiber 108, the first filament 110 completely (e.g., about 90% or more, about 95% or more, about 99% or more, or about 100%) envelops the second filament 112. This is shown in FIG. 2F. In other examples the second filament 112 at least partially (e.g., about 5%, about 10%, about 25%, about 40%, about 55%, or about 70% and the range can be up to 90%, about 80%, about 70%, about 60%, or about 50%) envelops the first filament 110. This is shown in FIG. 2E.

The first filament 110 and the second filament 112 can be in direct contact along the majority of the length L of the first fiber 108 and laminated or joined to each other at the interface 118 along the majority (e.g., about 50% or more, about 60% or more, about 75% or more, about 90% or more, about 95% or more, or about 100%) of the length of the first fiber 108. While the interface 118 defines the internal surface, an external surface 120 of the first fiber 108 is defined by a portion of the first filament 110 along a majority (e.g., about 50% or more, about 60% or more, about 75% or more, about 90% or more, about 95% or more, or about 100%) of the length of the first fiber 108 and by a corresponding portion of the second filament 112. A delamination region can also be defined along the interface 118.

In an individual first fiber 108, the first filament 110 and the second filament 112 can account for a different weight percentage of the first fiber 108. In some aspects, the first filament 110 will account for a greater weight percentage of the first fiber 108. For example, the first filament can range from about 5 wt % to about 90 wt % greater than a weight percentage of the second fiber, or from about 10 wt % to about 90 wt %, about 15 wt % to about 85 wt %, about 20 wt % to about 80 wt %, about 25 wt % to about 75 wt %, about 30 wt % to about 70 wt %, about 35 wt % to about 65 wt %, about 40 wt % to about 60 wt %, or about 45 wt % to about 55 wt % greater than a weight percentage of the second fiber.

As stated herein, the first filament 110 can include a first thermoplastic polymeric material. The first thermoplastic polymeric material can include one or more first polymers. The one or more first polymers can range from about 80 wt % to about 100 wt % of the first thermoplastic polymeric material, or from about 82 wt % to about 98 wt %, about 84 wt % to about 96 wt %, about 86 wt % to about 94 wt %, about 88 wt % to about 92 wt %, or about 90 wt % to about 91 wt % of the first thermoplastic polymeric material.

The one or more first polymers of the first thermoplastic material can be selected from many suitable polymers. For example, the one or more first polymers may be selected from a polyester, a polyamide, a polyurethane, a polyacrylamide, a polycarbonate, a polyether, a cellulose, a polyimide, a copolymer thereof, or a mixture thereof. In examples where the one or more first polymers includes a polyamide, suitable examples of polyamides include nylon-6; nylon-4,6; nylon-6,6; nylon-6,10; nylon-11; nylon-12, a copolymer thereof, or a mixture thereof. In some examples, about 90 wt % to about 100 wt % of the one or more first polymers are polyamides.

The one or more first polymers can be selected to be substantially hydrophilic polymers. For example a polymer of the first thermoplastic material after having been dried at 80° C. for a time ranging from about 1 hour to about 48 hours upon exposure to 30% to 100% relative humidity the, one or more first polymers absorbs about 10 wt % to about 100 wt % water, or about 15 wt % to about 95 wt % water, about 20 wt % to about 90 wt % water, about 25 wt % to about 85 wt % water, about 30 wt % to about 80 wt % water, about 35 wt % to about 75 wt % water, about 40 wt % to about 70 wt % water, about 45 wt % to about 65 wt % water, or about 50 wt % to about 60 wt % water.

The degree to which the one or more first polymers absorbs water can be, in some aspects, a function of the inherent hydrophilic properties of the one or more first polymers. Additionally, the hydrophilicity of the one or more first polymers can be tuned. For example, the degree to which the one or more first polymers is crosslinked can be tuned, in some examples, hydrophilic or hydrophobic groups may be grafted to the one or more first polymers. Non-polymer additives can also be added to the first thermoplastic material. The non-polymer additive can increase the hydrophilicity of the first polymer. In some examples the non-polymer additive can range from about 1 wt % to about 10 wt % of the first thermoplastic polymeric material, or from about 2 wt % to about 9 wt %, about 3 wt % to about 8 wt %, about 4 wt % to about 7 wt %, or about 5 wt % to about 6 wt % of the first thermoplastic material. Suitable examples of non-polymer additives include a sulfonate component, a clay component, a phenolic resin component, a cellulose component, a nanogel component, or a mixture thereof.

As stated herein, the second filament 112 can further include a second thermoplastic polymeric material. The second thermoplastic polymeric material can include one or more second polymers. The second thermoplastic polymeric material can include one or more second polymers. The one or more second polymers can range from about 80 wt % to about 100 wt % of the second thermoplastic polymeric material, or from about 82 wt % to about 98 wt %, about 84 wt % to about 96 wt %, about 86 wt % to about 94 wt %, about 88 wt % to about 92 wt %, or about 90 wt % to about 91 wt % of the second thermoplastic polymeric material.

The one or more second polymers of the second thermoplastic material can be selected from suitable polymers. For example, the one or more second polymers can include a polyester, a polyether, a polycarbonate, a polyolefin, a polystyrene, a polyacrylate, a polyvinyl chloride, a polyvinyl ether, a fluoropolymer, a copolymer thereof, or a mixture thereof. In some examples, about 90 wt % to about 100 wt % of the one or more first polymers are polyesters. Suitable examples of polyesters can include a polyglycolide, a polyactic acid, a polycaprolactone, a polyhydroxyalkanoate, a polyhydroxybutyrate, a polyethylene adipate, a polybutylene succinate, a poly(3-hydroxybutyrate-co-3-hydroxyvalerate), a polyethylene terephthalate, a polybutylene terephthalate, a polytrimethylene terephthalate, a polyethylene naphthalate, a copolymer thereof, or a mixture thereof.

In some aspects, the one or more second polymers can be selected to be relatively hydrophobic relative to the one or more first polymers. For example, a polymer of the second thermoplastic material after having been dried at 80° C. for a time ranging from about 1 hour to about 48 hours upon exposure to 30% to 100% relative humidity, the one or more second polymers absorbs about 0.1 wt % to about 30 wt % water, or about 0.5 wt % to about 29.5 wt % water, about 1 wt % to about 29 wt % water, about 1.5 wt % to about 28.5 wt % water, about 2 wt % to about 28 wt % water, about 2.5 wt % to about 27.5 wt % water, about 3 wt % to about 27 wt % water, about 3.5 wt % to about 26.5 wt % water, about 4 wt % to about 26 wt % water, about 4.5 wt % to about 25.5 wt % water, about 5 wt % to about 25 wt % water, about 5.5 wt % to about 24.5 wt % water, about 6 wt % to about 24 wt % water, about 6.5 wt % to about 23.5 wt % water, about 7 wt % to about 23 wt % water, about 7.5 wt % to about 22.5 wt % water, about 8 wt % to about 22 wt % water, about 8.5 wt % to about 21.5 wt % water, about 9 wt % to about 21 wt % water, about 9.5 wt % to about 20.5 wt % water, about 10 wt % to about 20 wt % water, about 10.5 wt % to about 19.5 wt % water, about 11 wt % to about 19 wt % water, about 11.5 wt % to about 18.5 wt % water, about 12 wt % to about 18 wt % water, about 12.5 wt % to about 17.5 wt % water, about 13 wt % to about 17 wt % water, about 13.5 wt % to about 16.5 wt % water, about 14 wt % to about 16 wt % water, or about 14.5 wt % to about 15.5 wt % water.

However much wt % the one or more second polymers absorbs, the first thermoplastic polymeric material absorbs about 5 wt % to about 100 wt % more water than the second thermoplastic polymeric material, about 10 wt % to about 95 wt %, about 15 wt % to about 90 wt %, about 20 wt % to about 85 wt %, about 25 wt % to about 80 wt %, about 30 wt % to about 75 wt %, about 35 wt % to about 70 wt %, about 40 wt % to about 65 wt %, about 45 wt % to about 60 wt %, or about 50 wt % to about 55 wt % more water than the second thermoplastic polymeric material.

The individual first fibers 108 of the first region 104 and the second region 106 can have the same tensile strength or a different tensile strength. For example, the tenacity of the individual first fibers can range from about 3 grams per denier (g/d) to about 15 g/d, where g/d=((11.3/density g/cm$^3$)(GPa)). The tenacity of the individual fibers can also range from about 3.5 g/d to about 14.5 g/d, about 4 g/d to about 14 g/d, about 4.5 g/d to about 13.5 g/d, about 5 g/d to about 13 g/d, about 5.5 g/d to about 12.5 g/d, about 6 g/d to about 12 g/d, about 6.5 g/d to about 11.5 g/d, about 7 g/d to about 11 g/d, about 7.5 g/d to about 10.5 g/d, about 8 g/d to about 10 g/d, or about 8.5 g/d to about 9.5 g/d. In instances where the tensile strength of the individual first fibers 108 of the first region 104 and the second region 106 differ, the difference can range from about plus or minus 10% to about 70%, about 15% to about 65%, about 20% to about 60%, about 25% to about 55%, about 30% to about 50%, or about 35% to about 45%.

The individual first fibers 108 are formed generally by co-extruding the first filament 110 and the second filament 112. Co-extrusion can include depositing a first quantity of the first thermoplastic polymeric material and a second quantity of the second thermoplastic polymeric material into an extruder. The thermoplastic polymeric materials are extruded through a shaped die, which includes two ports. Each port receives one of the thermoplastic polymeric materials. While the specific shape of the die can be changed to suit different applications, the die is shaped to form the interface 118 where, as described above, the first filament 110 partially (e.g., about 5%, about 10%, about 25%, about 40%, about 55%, or about 70% and the range can be up to 90%, about 80%, about 70%, about 60%, or about 50%) envelopes the second filament 112. For example, the first port, through which the first thermoplastic polymeric materials passes, can have a crescent-shaped cross-section. Additionally, the second port, through which the second thermoplastic polymeric materials passes has a circular cross-section. When the two thermoplastic polymeric materials are simultaneously extruded through the die, the second thermoplastic polymeric materials is shaped by the portion of the die having the circular cross-section and the first thermoplastic polymeric materials is shaped by the portion of the die having the crescent-shaped cross-section. As the two thermoplastic polymeric materials exit the die, they contact each other and become substantially (e.g., about 50% or more, about 60% or more, about 70% or more, about 80% or more, about 90% or more, about 95% or more, or about 99%) joined or laminated along the interface 118, potentially subject to a small number of gaps therebetween. As a result of the shape of the first and second ports of the die, the interface can be crescent-shaped.

Following extrusion, the individual first fibers 108 can be drawn along a length of the fiber. Once the individual fibers 108 are drawn, the first filament 110 and the second filament 112 are substantially delaminated along the length of the fiber 108 along the interface 118. For example, the first filament 110 and the second filament 112 can be delaminated along about 10 length % to about 100 length % of the first fiber 108 along the interface 118, about 15 length % to about 95 length %, about 20 length % to about 90 length %, about 25 length % to about 85 length %, about 30 length % to about 80 length %, about 35 length % to about 75 length %, about 40 length % to about 70 length %, about 45 length % to about 65 length %, or about 50 length % to about 60 length %. The delamination across the length of the first fiber 108 along the interface 118 can be continuous or discontinuous. For example, if the first filament 110 and the second filament 112 are delaminated along 80 length % of the first fiber 108 along the interface 118, the delamination would be continuous if the delamination is constant across 80 length % of the first fiber 108. Alternatively, the delamination would be discontinuous if along the length of the first fiber, there is at least one laminated portion between two delaminated portions.

Figure 3A:
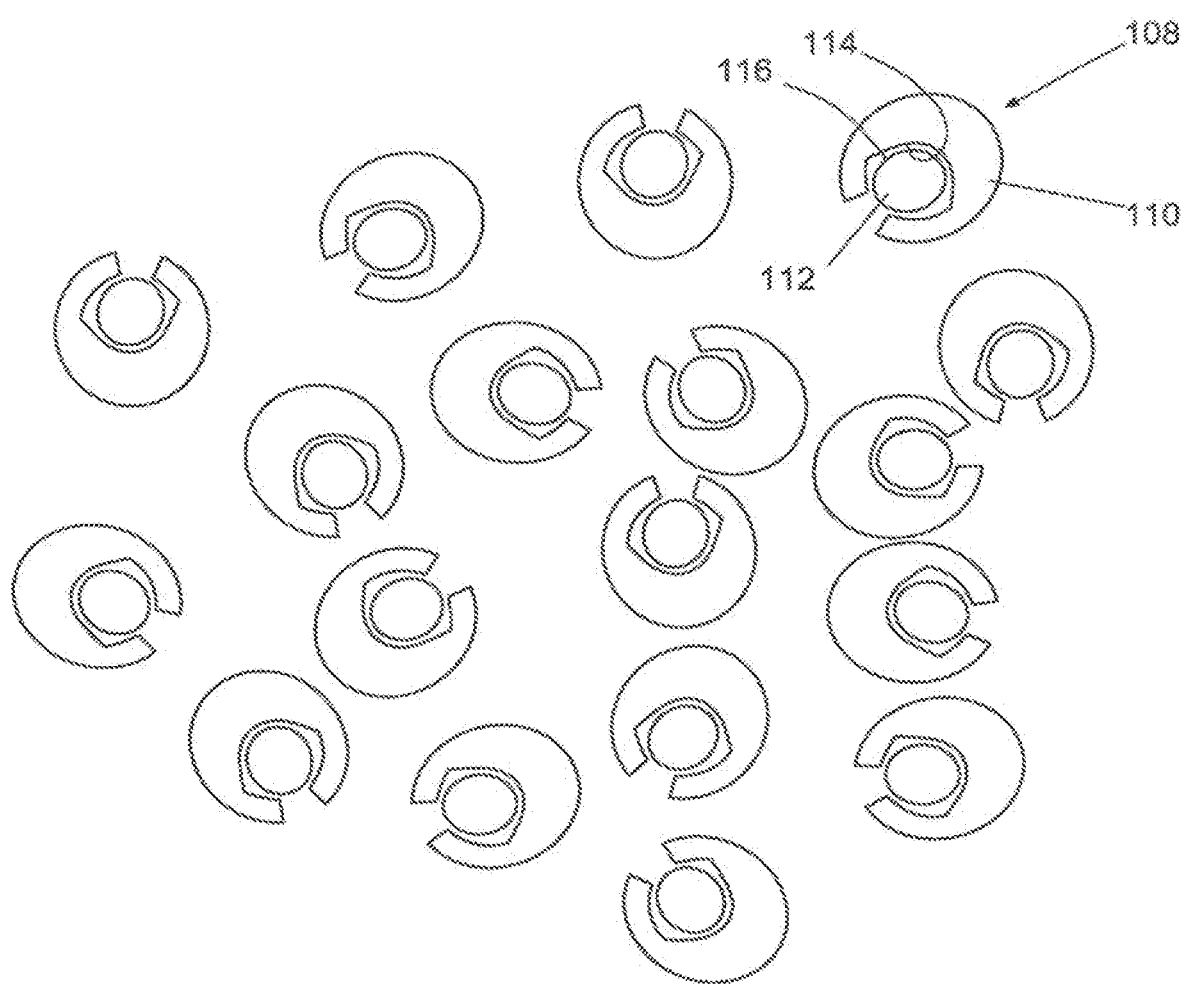
FIG. 3A is an end view of a plurality of the fibers following extrusion and drawing, in accordance with various aspects.

Regardless of the extent of delamination or whether the delamination is continuous, the second filament remains at least partially enveloped by the first filament. Therefore, the first filament 110 and the second filament 112 remain in substantially (e.g., about 50% or more, about 60% or more, about 70% or more, about 80% or more, about 90% or more, about 95% or more, or about 99%) direct contact along the length of the individual first fibers 108. FIG. 3A is a schematic depiction of a plurality of individual first fibers 108 following extrusion and drawing. As shown in FIG. 3A, the individual fibers are delaminated at the delamination region along the interface.

Figure 3B:
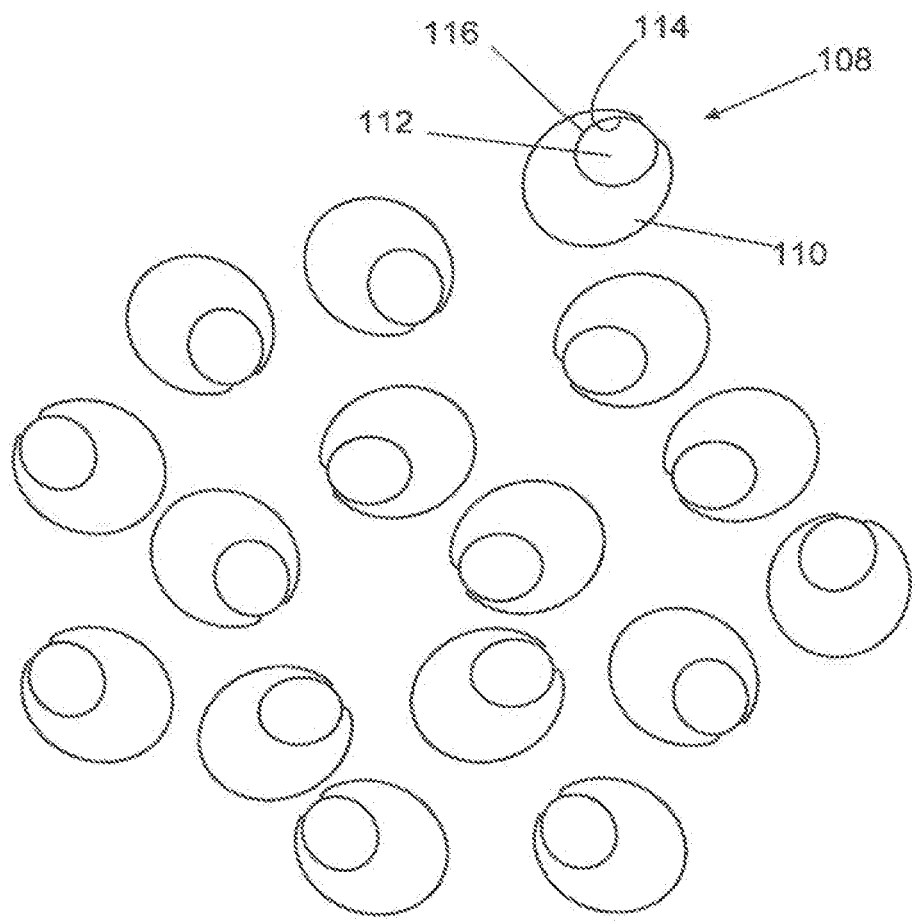
FIG. 3B is a schematic view of a plurality of the fibers following heat treatment, in accordance with various aspects.

Following the drawing stage, the first filament 110 and the second filament 112 can be joined or laminated at the interface 118 along a length of the individual first fibers 108. This is shown in FIG. 3B, which is a schematic depiction of a plurality of individual first fibers 108 in which the first filament 110 and the second filament 112 are joined. The first filament 110 and the second filament 112 can be joined along about 5 length % to about 100 length % of the individual first fiber 108, or about 10 length % to about 95 length %, about 15 length % to about 90 length %, about 20 length % to about 85 length %, about 25 length % to about 80 length %, about 30 length % to about 75 length %, about 35 length % to about 70 length %, about 40 length % to about 65 length %, or about 50 length % to about 55 length %.

In an aspect, laminating the first filament 110 and the second filament 112 can be accomplished by heating the individual first fibers 108 or portions thereof to create the first region 104 or the second regions 106 of FIGS. 1A-1C. Heating can be accomplished, for example, with a heat bath, or through embossing. Through heating, the individual first fibers 108 of the first region 104 or the second region 106 can be selectively heated. Additionally, the individual fibers 108 of the first region can be heated to laminate the first filament 110 and the second filament 112 while the individual fibers 108 of the second region 106 may not be heated so that the first filament 110 and the second filament 112 therein remain delaminated.

As discussed herein, whether the first filament 110 and the second filament 110 are laminated or delaminated affects whether the individual first fiber 108 expands or contracts in response to the moisture stimulus. Briefly stated, if the filaments 110 and 112 are delaminated, then the first fiber 108 will expand; whereas if the filaments 110 and 112 are laminated, then the first fiber 108 will contract in response to a moisture stimulus.

The first region 104 can be heated from about 30 seconds to about 6 hours, from about 5 minutes to about 5.5 hours, about 30 minutes to about 5 hours, about 1 hour to about 4.5 hours, about 1.5 hours to about 4 hours, about 2 hours to about 3.5 hours, or about 2.5 hours to about 3 hours. The temperature that the first region 104 is heated at can range from about 50° C. to about 280° C., from about, about 60° C. to about 270° C., about 70° C. to about 260° C., about 80° C. to about 250° C., about 90° C. to about 240° C., about 100° C. to about 230° C., about 110° C. to about 220° C., about 120° C. to about 210° C., about 130° C. to about 200° C., about 140° C. to about 190° C., about 150° C. to about 180° C., or about 160° C. to about 170° C.

Figure 4A:
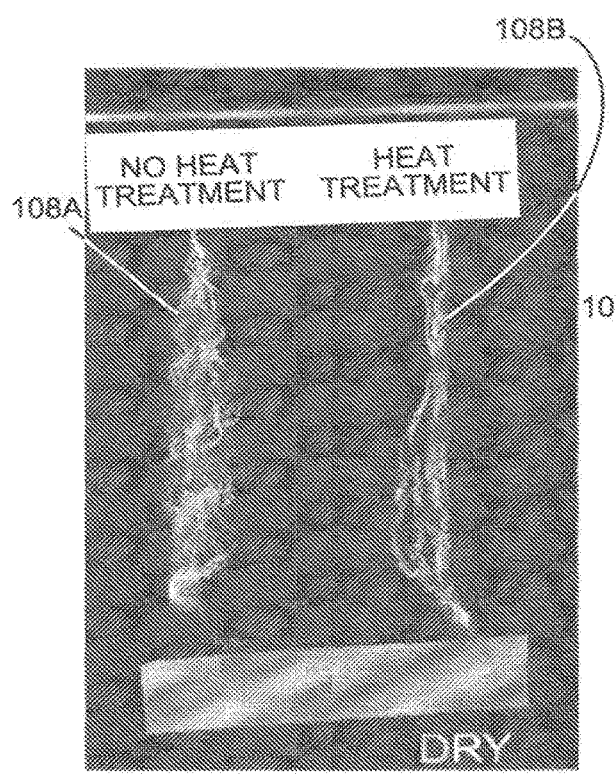
FIG. 4A is a photograph of a first group of dry fibers that are not heat treated and a second group of dry fibers that are heat treated, in accordance with various aspects.
Figure 4B:
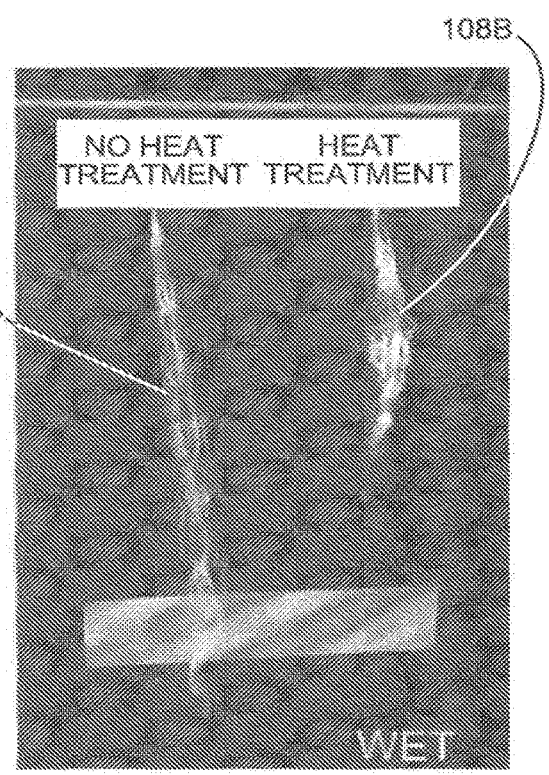
FIG. 4B is a photograph of the first group of fibers of FIG. 4A under wet conditions that are not heat treated and the second group of fibers of FIG. 4A under wet conditions that are heat treated, in accordance with various aspects.

Increasing the temperature of the individual first fibers 108 at, for example, the first region 104, can alter the mechanical change (e.g., expansion or contraction) of the first region in response to an external moisture stimulus (e.g., a change in relative humidity) relative to a state of the first region prior to the increasing the temperature. For example, if the individual first fibers 108 of the first region are heated such that the first filament 110 and the second filament 112 are laminated, then upon a change in relative humidity the individual first fibers, contracts in length %. Conversely, if subsequent to drawing, the individual first fibers 108 of the first region are not heated such that the first filament 110 and the second filament 112 remain delaminated, then upon a change in relative humidity the individual first fibers expand in length %. This is shown in FIGS. 4A and 4B, which are images of individual first fibers 108. FIG. 4A shows drawn first fibers 108A and heated first fibers 108B in an "equilibrium state" under humidity conditions ranging from about 40% relative humidity to about 60% relative humidity. FIG. 4B shows drawn first fibers 108A and heated first fibers 108B in an activated state exposed to an external moisture stimulus above a threshold value. The external moisture stimulus was supplied by lightly spraying the first fibers 108A and 108B with water.

Without intending to be bound to any theory, the mechanical change in the first region 104 and if present the second region 106 is driven by the reaction to a change in relative humidity by the individual first fibers 108. The two thermoplastic polymeric compositions react differently to a change in humidity above a threshold value. An increase in the relative humidity can cause the first thermoplastic polymeric composition to increase in length, while the second composition does not increase in length as much as the first composition under the same conditions. When there are a relatively high number of individual first fibers 108 that are delaminated or include delaminated regions along the length of the fiber, both of the filaments 110 and 112 are free to expand. In contrast, when there are a relatively high number of individual first fibers 108 that are laminated or include laminated regions along the length of the fiber, the increase in length of the first filament 110 coupled with the lesser increase in length, if any, of the second filament 112 can cause the fiber 108 to "kink" or "pucker" along its length. The second filament 112 appears to act as an "anchor," which prevents the first filament 110 from fully expanding thus shortening the overall length of the fiber. Thus, if the textile 102 is formed of the individual fibers 108, regions which have not been heat treated will expand when exposed to an increased level of moisture, while regions which have been heat treated will contact.

The textile 102, formed from the individual fibers 108, can be one of many different types of textiles. For example, the textile 102 can be a non-woven textile. Examples of suitable non-woven textiles include a spun-bound non-woven textile, a melt-blown non-woven textile, a needle entangled non-woven textile, or a water-entangled non-woven textile. Alternatively, the textile 102 can be a woven textile, a braided textile, a knit textile, or a non-woven textile. In some examples of the textile 102, the textile can be formed from a collection of individual first fibers 108 that can be aligned in in substantially the same direction. In other examples, the textile 102 can be formed from one or more yarns each including a plurality of first fibers 108.

The individual first fibers 108 can be incorporated into the textile 102 in many different ways. For example, the individual first fibers 108 may entirely form the textile 102. If the textile 102 is formed entirely of the individual first fibers 108 then the response of textile 102 response to moisture will depend on whether the individual first fibers 108 have been heat treated. Alternatively, the individual first fibers 108 can be selectively incorporated into the textile 102.

Selectively incorporating the individual first fibers 108 into the textile 102 can impart local, as opposed to global, change in the textile 102. For example, instead of the entirety of the textile 102 contracting or expanding in response to a moisture stimulus, only a portion will react in response to the stimulus.

In an aspect, the textile can include a yarn including one or more fibers (e.g., first fiber) of the present disclosure. Yarn is a raw material utilized to form textiles. In general, "yarn" is defined as an assembly having a substantial length and relatively small cross-section that is formed of at least one filament or a plurality of fibers or filaments. Yarn may be formed of a single filament, which is conventionally referred to as a "monofilament yarn," or a plurality of individual filaments grouped together. Yarn also may include separate filaments formed of different materials, or the yarn may include filaments that are each formed of two or more different materials.

Figure 5:
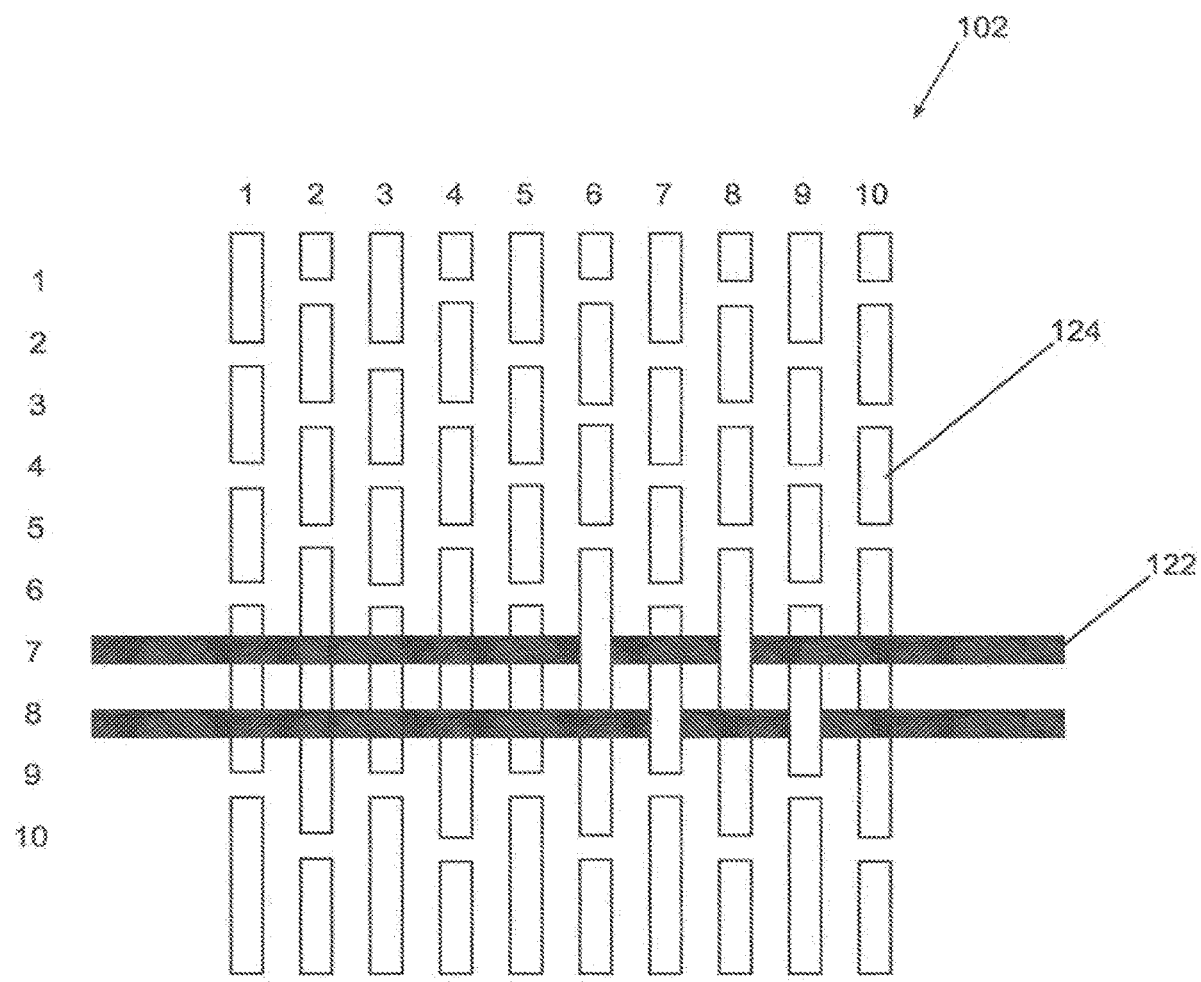
FIG. 5 is a schematic diagram of the textile including the fibers in a woven pattern, in accordance with various aspects.

An example of the textile 102 with selectively incorporated yarns 122 including the first fibers 108 is shown in FIG. 5. FIG. 5 is a schematic depiction of the textile 102. As shown textile 102 includes the yarns 122 including the first fibers and yarns 124 including second fibers. The second fibers can differ from the first fibers in many respects. For example, second fibers can be a mono-component fiber; made of materials other than the thermoplastic polymeric components described herein; the cross-section of the second fibers can be different. Whatever the difference is, in some aspects, the second fibers will not expand or contract to the same extent, if at all, in response to a moisture stimulus as compared to the first fiber. In some examples, the second fibers are an elastic fiber, which has the ability to deform in response to force and subsequently resume its shape absent the force.

When the yarns 122 are interwoven with the yarns 124, the yarns 122 can be referred to as actuation yarns that, in some examples, the yarns 122 will expand or contract in response to a moisture stimulus. Because the yarns 122 are interwoven with the yarns 124, the expansion or contraction of the yarns 122 will cause at least one of the yarns 124 to expand or contract as well. This can be because the yarns 122 and the yarns 124 are interwoven in such a way, as shown in FIG. 5, that the yarns 124 are biased against the yarns 122. Therefore, when the yarns 122 expand or contract the yarns 124 are forced to contract or expand in kind.

The ability of the yarns 122 to cause at least one of the yarns 124 to expand or contract can result in the textile 102 and a corresponding portion of the garment 100, having a flat or lofty structure depending on the expansion or contraction yarns 122. For example, if the yarns 122 are not heat treated they can have a flat structure when the yarns 122 are exposed to moisture. This is because the yarns 122 expand thereby stretching and flattening the textile 122. Alternatively, if the yarns 122 are heat treated and exposed to moisture above the threshold value, the yarns 122 contract, thereby compressing and kinking the textile, this creates a lofty structure.

Figure 6:
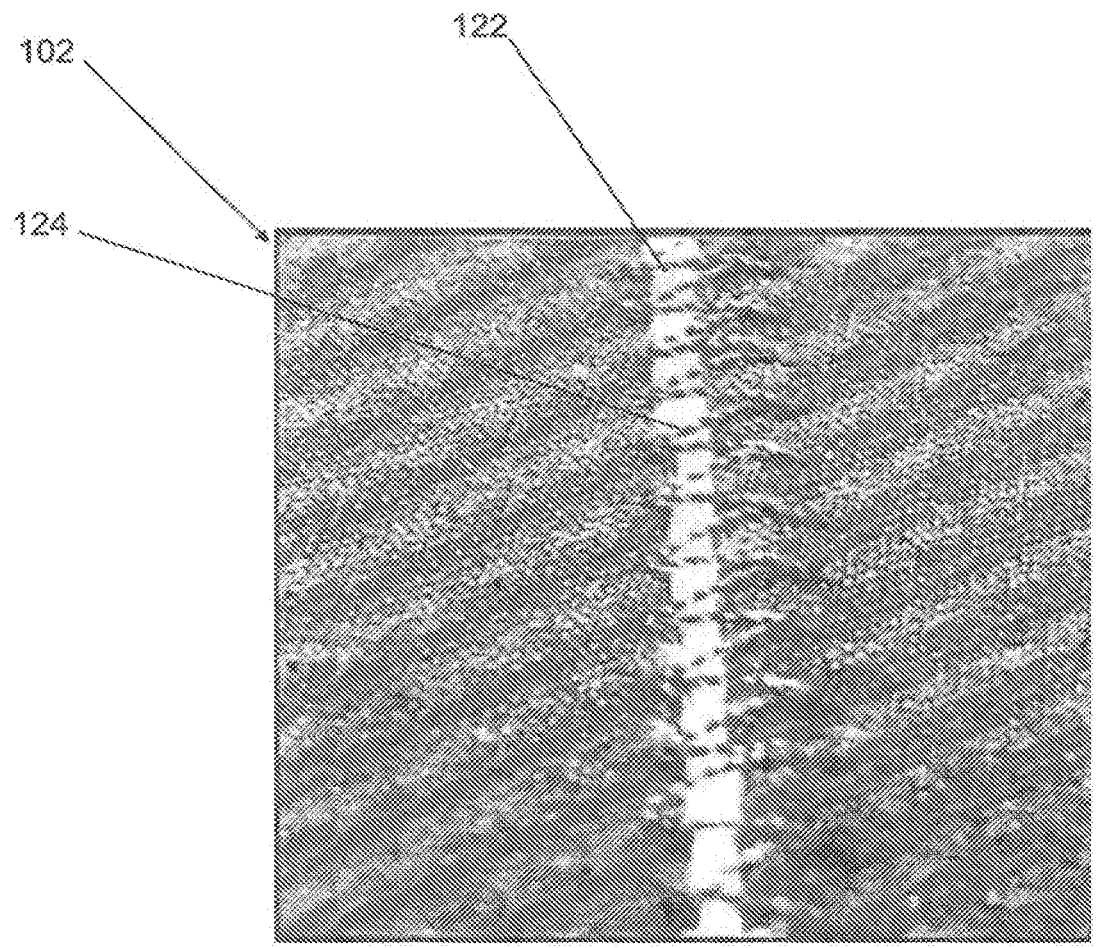
FIG. 6 is a photograph showing one aspect of the textile, in accordance with various aspects.
Figure 7:
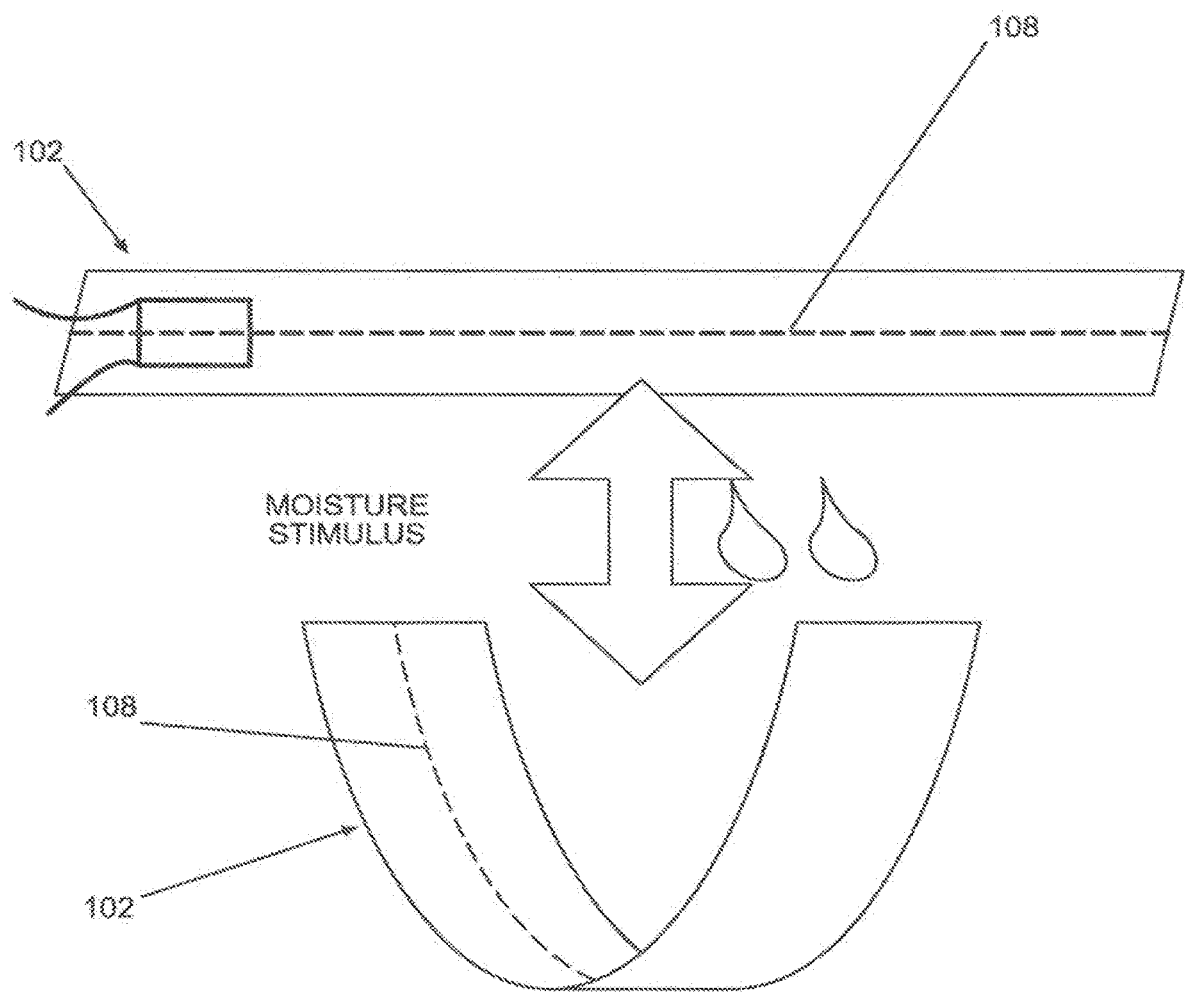
FIG. 7 is a schematic depiction of the one aspect of the textile shown in FIG. 6 upon exposure to moisture, in accordance with various aspects.

Another example of the individual first fibers 108 being incorporated in the textile 102 is shown in FIG. 6 and FIG. 7. FIG. 6 is a photograph of the textile 102. As shown in FIG. 6 the yarn 122, including individual fibers 108, is incorporated into the textile 102. In this example, the yarn 122 is embroidered into the textile 102, with the yarns 124 securing the yarn 122 thereto.

FIG. 7 is a schematic depiction of the textile 102 shown in FIG. 6 upon exposure to moisture. In this example, individual first fiber 108, or the yarn 122, is heat treated, then as shown, once the individual first fiber 108 contracts upon exposure to a moisture stimulus, contraction causes a shape change in the textile 102. As shown, the textile 102 has a generally compressed shape. As shown, this can create a lofty structure in the textile 102 and the resulting garment 100. Alternatively, if the individual first fibers 108 of the yarn 122 is not heat treated, or when the individual first fibers 108 are heat treated but under "dry" (e.g., no moisture or moisture level below a threshold value) conditions, then the yarn 122 will expand, which can flatten the textile 102.

Figure 8A:
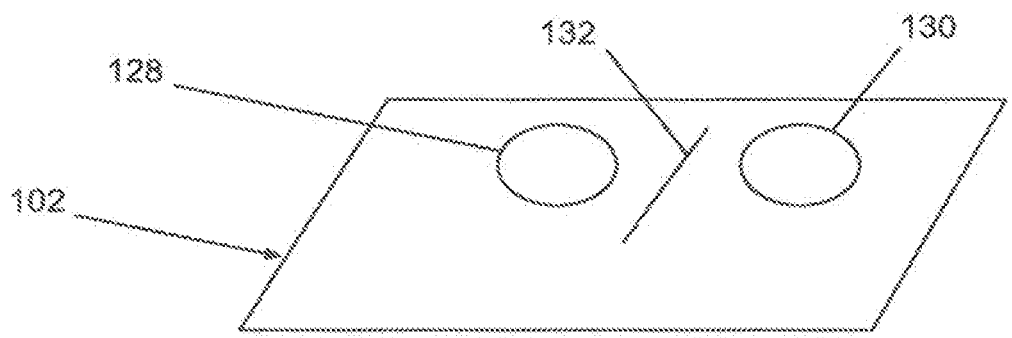
FIGS. 8A-8D are schematic depictions of some aspects of the textile with locally heat treated regions, in accordance with various aspects.
Figure 8B:
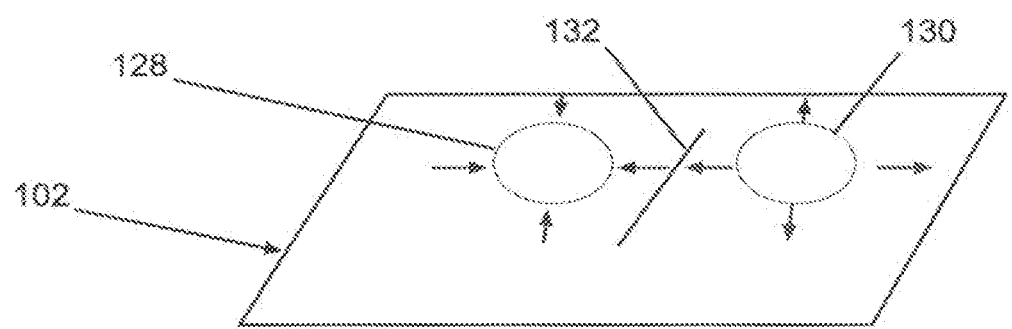

In addition to the individual fibers 108, or the yarns 122, being selectively incorporated into the textile 102, the individual fibers 108 can be selectively treated such that portions of the textile 102 will selectively expand or contract upon exposure to moisture. FIG. 8A is a schematic depiction of the textile 102 including a first heat treated section 128 and a second heat treated region 130. The sections 128 and 130 can be heat treated in many different ways. Selectively heat treating the textile 102 can result in localized shape change throughout the textile 102 as shown in FIG. 8B.

Figure 8C:
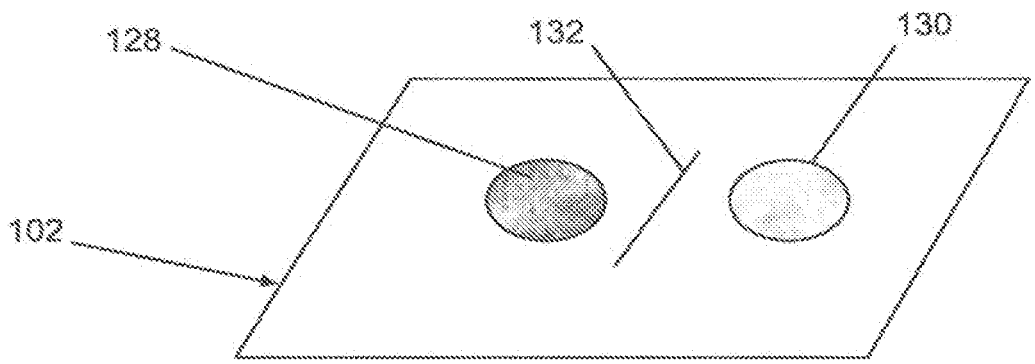
Figure 8D:
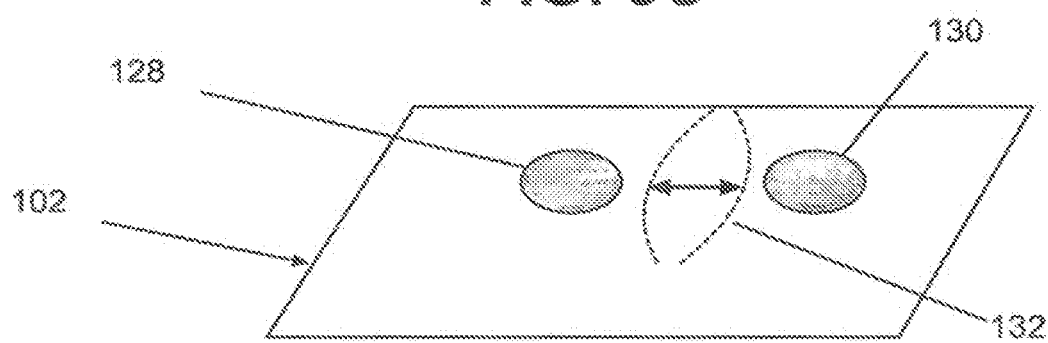

Additional features can be incorporated into the textile 102 that can act in conjunction with the individual fibers 108 and/or the sections 128 and 130. For example, FIG. 8C shows the textile 102 as illustrated in FIGS. 8A and 8B with slit 132 incorporated therein. As shown in FIG. 8D, contraction of sections 128 and 130 upon exposure to a moisture stimulus can cause slit 132 to open thereby creating openings in textile 102 that can serve to, among other things, vent.

The individual first fibers 108, or yarns 122, can cause other shape changes in the textile 102. For example, a heat treated individual fiber 108 can be placed adjacent to untreated individual fiber 108. As shown in FIG. 9A and FIG. 9B, the yarn 122A, formed form individual fibers 108 that are not heat treated is paired with the yarn 122B, formed from heat treated individual fibers 108. Upon exposure to an external moisture stimulus, as shown in FIG. 9B, each of the yarns 122 either expands or contracts. Specifically, the yarn 122A expands and the yarn 122B contracts. Under dry conditions, as shown in FIG. 9A, the yarn 122A contracts and the yarn 122B expands. As shown in both FIGS. 9A and 9B selectively heat treating the yarns 122, can significantly alter the behavior of the yarns 122, and the shape of the textile 102 upon exposure to a moisture stimulus. That is the garment 100, or at least a portion of the garment 100 including the textile 102, can have a first shape under dry conditions and a second shape under "wet" (e.g., moisture levels above a threshold value) conditions. For example, the opposed motion of each of the yarns can change the shape of the textile 102. The shape change can result in the textile 102 being kinked or crumpled, which can increase the loftiness of the textile 102. The textile 102 can define the entirety of the garment 100 or an article of footwear or only a portion thereof. For example the textile 102 can be selectively incorporated into a shoulder or armpit region on the garment 100 or into an upper on an article of footwear.

The individual first fibers 108 can also be used within the garment 100 to move or reposition components of the garment 100. FIGS. 10A and 10B are schematic diagrams of a portion of the garment 100 showing individual first fibers 108, elastic component 134, and an insulation material 136. The elastic component 134 can be any suitable elastic material, examples of such materials include polyurethanes or thermoplastic polyurethanes. The insulation material 136 can be any suitable insulation material such as fleece, or down material as non-limiting examples. The individual first fibers 108 are heat treated so that they contract upon exposure to moisture above a threshold value. Both the individual first fibers 108 and the elastic component 134 are attached to the insulation 136 and to a layer 138 of the garment 100. As an example, the layer 138 can be a cotton material. As shown in FIG. 10A, before exposure to a moisture stimulus, a contracting force A of the individual first fibers 108 is overcome by the expanding force B of the elastic component 134. This creates a lofty structure in the garment 100 between 136 and 138. Conversely, when the garment is exposed to moisture above a threshold value the contracting force A of the individual first fibers 108 overcomes the expansion force B of the elastic component 134, as shown in FIG. 10B. This results in the garment 100 having a less lofty structure between 136 and 138.

Figure 11A:
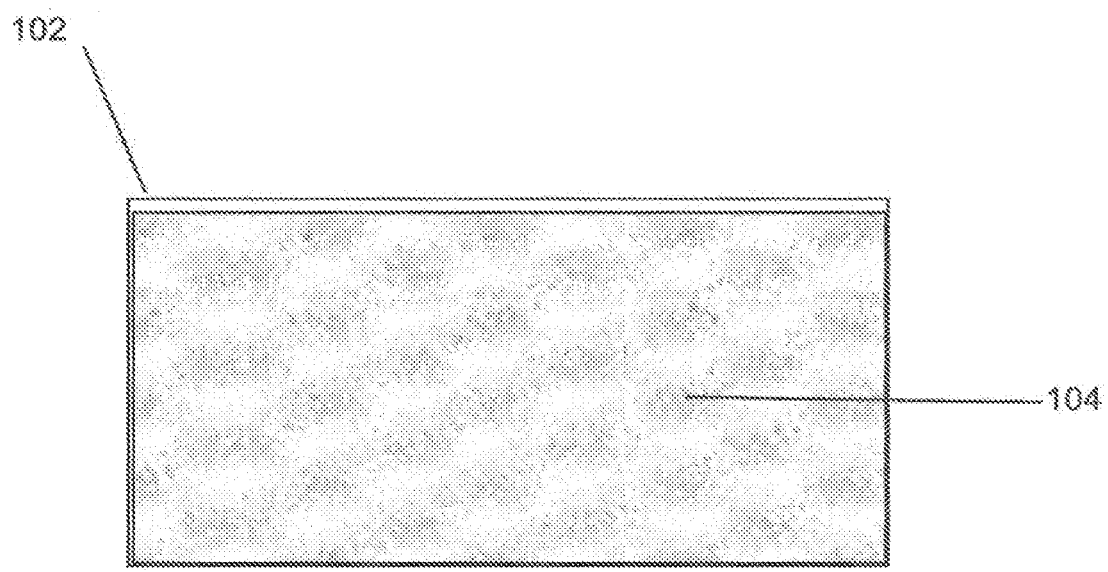
FIGS. 11A-11C are schematic views of the textile including an adhesive layer.
Figure 11B:
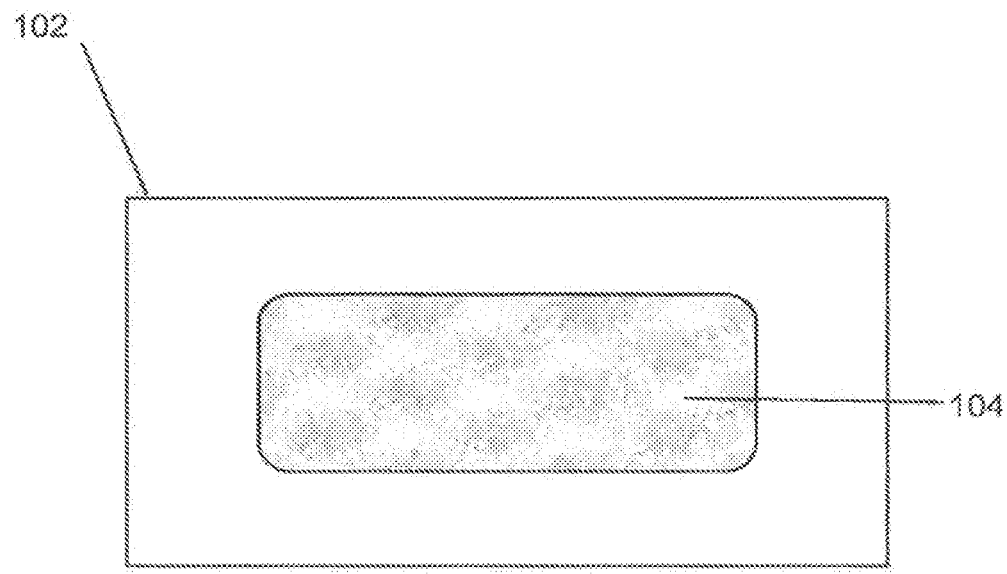
Figure 11C:
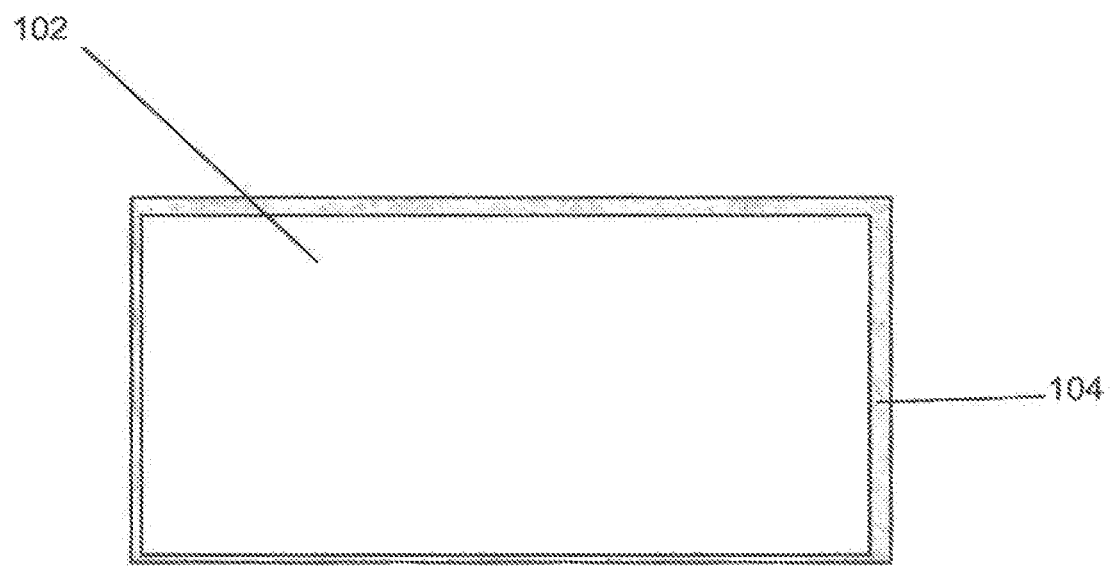

Localized shape change in the garment 100 can be further accomplished by affixing an adhesive to the textile 102. The textile 102 can then be attached to the garment (or any other article such as footwear). The adhesive can be a double sided tape or a film for example applied to the textile 102 or the garment 100. The adhesive can be applied to the textile 102 to a variable extent. FIGS. 11A-11C are schematic views of the textile 102 including an adhesive layer 104. For example, as shown in FIG. 11A the adhesive layer 140 is applied across substantially 100% of the surface area of one side of the textile 102. As shown in FIG. 11B, the adhesive layer 140 is applied across about 50% of the surface area of one side of the textile 102. As shown in FIG. 11C, the adhesive layer 140 is applied along the perimeter of one side of the textile 102. The extent to which the adhesive is applied to the textile can impact the adhesion of the textile 102 to the garment 100. Once the adhesive is applied to either the textile 102 or the garment 100, the textile 102 can then be directly adhered to a portion of the garment. Thus, depending on whether the individual fibers 108 are heat treated or not, that portion of the garment 100 will contract or expand in response to moisture.

EXAMPLES

Now having described the aspects of the disclosure, in general, the examples describe some additional aspects. While aspects of the present disclosure are described in connection with the example and the corresponding text and figures, there is no intent to limit aspects of the disclosure to these descriptions. On the contrary, the intent is to cover all alternatives, modifications, and equivalents included within the spirit and scope of aspects of the present disclosure.

A bi-component fiber is formed by dispensing a polyamide resin and a polyethylene terephthalate resin into an extruder. The polyamide resin was PA-6. The resins pass through a die with two ports. The first port of the die has a concave, substantially crescent-shaped cross-section. The second port of the die has a convex ovoid-shaped cross-section. The polyamide passes through the first port to form a first filament having a substantially crescent-shaped cross-section. The polyethylene terephthalate passes through the second port to form a second filament having a substantially circular-shaped cross-section. The polyamide filament and the polyethylene terephthalate filament are laminated along an interface defined having a substantially crescent-shaped cross-section. This is shown schematically in FIGS. 2A and 2B.

Figures 12A, 12B, 12C, 12D:
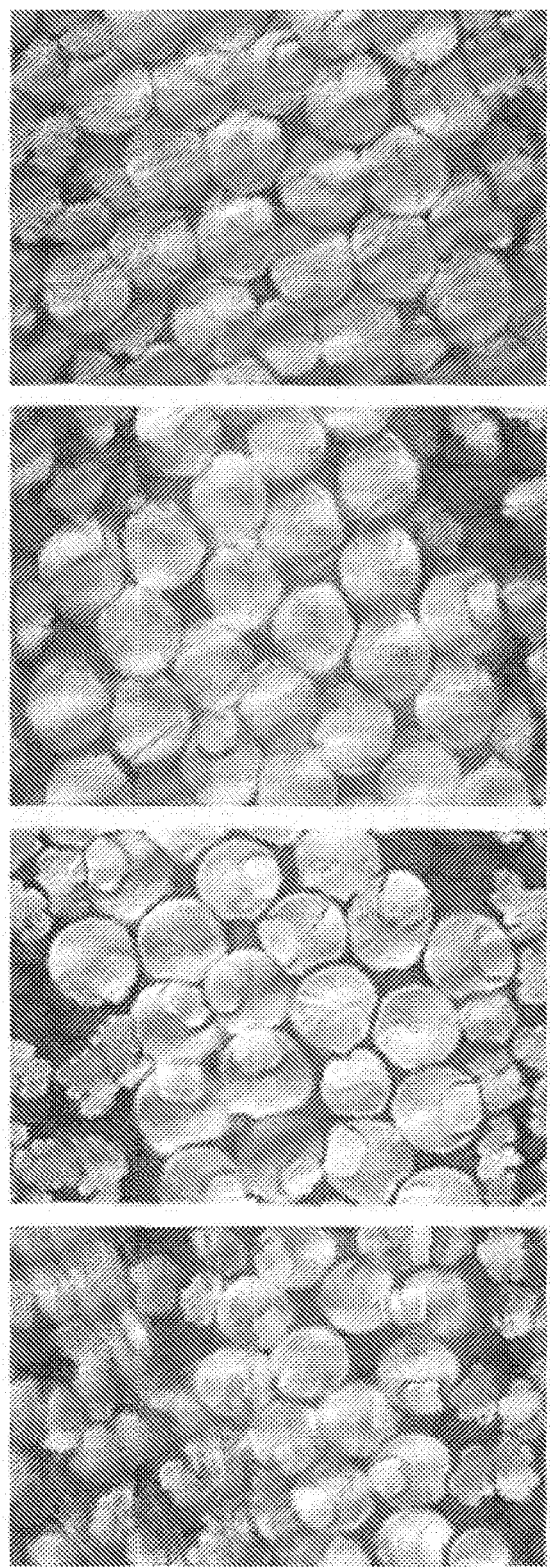
FIGS. 12A-12D are SEM images showing the bi-component fibers at draw ratios.

Following extrusion, the bi-component fibers are drawn. Upon drawing, the first filament and the second filament become delaminated along the interface. This is shown schematically in FIG. 3A. The extent to which the first filament and the second filament become delaminated depends on the draw ratio. As the draw ratio increases, the extent of the delamination increases. FIGS. 12A-12D are SEM images showing the bi-component fibers at various draw ratios. FIG. 12A shows a bi-component fiber at a zero draw ratio. FIG. 12B shows the bi-component fiber at a draw ratio of 120. FIG. 12C shows the bi-component fiber at a draw ratio of 140. FIG. 12D shows the bi-component fiber at a draw ratio of 160.

Selected bi-component fibers can be heat treated to re-laminate the interface between the first filament and the second filament. Those fibers that are heat treated are heated with a heat gun at a temperature of about 104° C.

FIG. 4A shows two groups of bi-component fibers. One group is not heat treated following drawing the other group is heat treated following drawing. FIG. 4A shows each group of bi-component fibers in a resting state. FIG. 4B shows the groups of bi-component fibers of FIG. 4A, upon exposure to moisture. Specifically, the groups of bi-component fibers are initially exposed to an environment having 40% humidity to about 60% humidity, in the fibers were in turn lightly sprayed with water. As shown, the bi-component fibers that were not heat treated expand in length % by about 30 length % whereas the bi-component fibers that were heat treated contract in length % by about 50 length %.

The bi-component fibers that were not heat treated are combined into a yarn. The heat treated bi-component fibers are also combined into a yarn. The yarns are selectively used to form a woven textile that is incorporated into a garment.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The present disclosure will be better understood upon review of the following clauses, which should not be confused with the claims.

Clause 1: A textile comprising: a first region of the textile comprising one or more first fibers, an individual first fiber having a length at least 10 times greater than a width of the individual first fiber, the individual first fiber comprising co-extruded first and second filaments, the first filament formed of a first thermoplastic polymeric material and having a cross section including a concave surface and the second filament formed of a second thermoplastic polymeric material and having a cross section including a convex surface, the co-extruded first and second filaments having an interface at which the concave surface of the first filament directly contacts and partially envelops the convex surface of the second filament, the interface defining an interior surface of the individual first fiber, an exterior surface of the individual first fiber defined by a portion of the first filament along a majority of the length of the individual first fiber and by a portion of the second filament along the majority of the length of the individual first fiber, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity.

Clause 2: A textile comprising: a first region of the textile comprising one or more first fibers, an individual first fiber having a length at least 10 times greater than a width of the individual first fiber, the individual first fiber comprising co-extruded first and second filaments, the first filament formed of a first thermoplastic polymeric material and having a cross section including a concave surface and the second filament formed of a second thermoplastic polymeric material and having a cross section including a convex surface, the co-extruded first and second filaments having an interface at which the concave surface of the first filament directly contacts and fully envelops the convex surface of the second filament, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity.

Clause 3: A textile comprising: a first region of the textile comprising one or more first fibers, an individual first fiber having a length at least 10 times greater than a width of the individual first fiber, the individual first fiber comprising co-extruded first and second filaments, the first filament formed of a first thermoplastic polymeric material, the co-extruded first and second filaments having an interface at which the first filament directly contacts the second filament, the interface defining an interior surface of the individual first fiber, an exterior surface of the individual first fiber defined by a portion of the first filament along a majority of the length of the individual first fiber and by a portion of the second filament along the majority of the length of the individual first fiber, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity.

Clause 4: The textile as in any of clauses 1-3, wherein the first region of the textile contracts or expands by at least 1 width % to about 60 width %, at least 1 length % to about 60 length %, or at least 1 width % to about 60 width % and 1 length % to about 60 length %.

Clause 5: The textile as in any of clauses 1-4, wherein the first region of the textile defines about 5% to about 100% of a total surface area of the textile.

Clause 6: The textile as in any of clauses 1-5, wherein the first region of the textile ranges from about 0.05 mm$^2$ to about 10 mm$^2$.

Clause 7: The textile as in any of clauses 1-6, wherein: the textile further comprises a second region, and the second region contracts or expands by at least 1 length %, at least 1 width % or at least 1 length % and at least 1 width % relative to a resting state on a change in relative humidity of at least 10% over a range of about 30% relative humidity to about 100% relative humidity.

Clause 8: The textile of clause 7, wherein the second region of the textile contracts if the first region expands, or the second region expands if the first region contracts.

Clause 9: The textile as in any of clause 7 or 8, wherein a tensile strength of the first fibers of the second region of the textile differs from a tensile strength of the first fibers of the first region of the textile by at least plus or minus 10%.

Clause 10: The textile as in any of clauses 1-9, wherein the first region of the textile comprises heat treated first fibers.

Clause 11: The textile as in any of clauses 7-9, wherein the first region of the textile comprises a first concentration of the first fibers and the second region of the textile comprises a second concentration of the first fibers, and the first concentration differs from the second concentration by at least plus or minus 10%.

Clause 12: The textile as in any of clauses 1-11, wherein, on an individual fiber basis, a weight percentage of the first filament is at least 5 wt % greater than a weight percentage of the second fiber.

Clause 13: The textile as in any of clauses 1-12, wherein the first thermoplastic polymeric material comprises one or more first polymers.

Clause 14: The textile of clause 13, wherein the one or more first polymers are about 80 wt % to about 100 wt % of the first thermoplastic polymeric material.

Clause 15: The textile as in any of clauses 13 or 14, wherein the one or more first polymers comprise a polyester, a polyamide, a polyurethane, a polyacrylamide, a polycarbonate, a polyether, a cellulose, a polyimide, a copolymer thereof, or a mixture thereof.

Clause 16: The textile as in any of clauses 13-15, wherein the one or more first polymers comprise a polyamide.

Clause 17: The textile as in any of clauses 13-16, wherein the one or more first polymers consist essentially of polyamides.

Clause 18: The textile of clause 16, wherein the polyamides comprise nylon-6; nylon-4,6; nylon-6,6; nylon-6,10; nylon-11; nylon-12, a copolymer thereof, or a mixture thereof.

Clause 19: The textile as in any of clauses 1-18, wherein the first thermoplastic polymeric material absorbs at least 10 wt % water.

Clause 20: The textile as in any of clauses 1-19, wherein the first thermoplastic polymeric material comprises a non-polymer additive.

Clause 21: The textile of clause 20, wherein the non-polymer additive is about 1 wt % to about 10 wt % of the first thermoplastic polymeric material.

Clause 22: The textile as in any of clauses 20 or 21, wherein the non-polymer additive is a sulfonate component, a clay component, a phenolic resin component, a cellulose component, a nanogel component, or a mixture thereof.

Clause 23: The textile as in any of clauses 1-22, wherein the second thermoplastic polymeric material comprises one or more second polymers.

Clause 24: The textile of clause 23, wherein the one or more second polymers comprise about 80 wt % to about 100 wt % of the second thermoplastic polymeric material.

Clause 25: The textile as in any of clauses 23 or 24, wherein the one or more second polymers includes a polyester, a polyether, a polycarbonate, a polyolefin, a polystyrene, a polyacrylate, a polyvinyl chloride, a polyvinyl ether, a fluoropolymer, a copolymer thereof, or a mixture thereof.

Clause 26: The textile as in any of clauses 23-25, wherein the one or more second polymers comprise polyesters.

Clause 27: The textile as in any of clauses 23-26, wherein the one or more second polymers consist essentially of one or more polyesters.

Clause 28: The textile of clause 26, wherein the one or more polyesters include a polyglycolide, a polyactic acid, a polycaprolactone, a polyhydroxyalkanoate, a polyhydroxybutyrate, a polyethylene adipate, a polybutylene succinate, a poly(3-hydroxybutyrate-co-3-hydroxyvalerate), a polyethylene terephthalate, a polybutylene terephthalate, a polytrimethylene terephthalate, a polyethylene naphthalate, a copolymer thereof, or a mixture thereof.

Clause 29: The textile as in any of clauses 23-28, wherein the first thermoplastic polymeric material absorbs at least 5 wt % of water more than the second thermoplastic polymeric material.

Clause 30: The textile as in any of clauses 23-29, wherein the second thermoplastic polymeric material absorbs less than 2 wt % water.

Clause 31: The textile as in any of clauses 1-30, wherein the textile is a non-woven textile.

Clause 32: The textile of clause 31, wherein the non-woven textile is a spun-bound non-woven textile, a melt-blown non-woven textile, a needle entangled non-woven textile, or a water-entangled non-woven textile.

Clause 33: The textile as in any of clauses 1-32, wherein in the first region, a majority of the first fibers are oriented in substantially the same direction with respect to each other.

Clause 34: The textile as in any of clauses 1-32, wherein the textile is a woven textile, a braided textile, a knit textile, or a non-woven textile.

Clause 35: The textile as in any of clauses 1-31, wherein the textile comprises one or more yarns comprising the one or more first fibers.

Clause 36: The textile as in any of clauses 34 or 35, wherein the textile is a knit textile.

Clause 37: The textile as in any of clauses 1-36, further comprising an adhesive affixed to the textile.

Clause 38: The textile clause 37, wherein the adhesive is at least one of a tape and a discontinuous film.

Clause 39: The textile as in any of clauses 37 or 38, wherein the adhesive is a tape.

Clause 40: An article comprising the textile as in any one of clauses 1-39.

Clause 41: The article of clause 40, wherein the article comprises a plurality of panels.

Clause 42: The article of clause 41, wherein at least one of the plurality of panels comprises the textile.

Clause 43: The article of clause 42, wherein the textile defines about 5 wt % to about 100 wt % of the at least one panel.

Clause 44: The article as in any of clauses 41-43, wherein the garment comprises a plurality of adjacent layers.

Clause 45: The article of clause 44, wherein the textile is joined between the adjacent layers.

Clause 46: The article of clause 44 or 45, wherein at least one of the adjacent layers is an insulative layer.

Clause 47: The article as in any of clauses 40-46, further comprising a slit defined by a surface of the article and extending at least partially through the article.

Clause 48: The article of clause 47, wherein the slit is adjacent to the textile.

Clause 49: The article as in any of clauses 47-48, wherein the slit is actuatable between a first substantially open position and a second substantially closed position.

Clause 50: The article of clause 49, wherein the slit is in the substantially open position when the textile expands by at least one of the at least 1 length %, at least 1 width %, and at least 1 length % and at least 1 width %.

Clause 51: The article of clause 49, wherein the slit is in the substantially closed position when the textile contracts by at least one of the at least 1 length %, at least 1 width %, and at least 1 length % and at least 1 width %.

Clause 52: A method of forming a textile comprising: forming a textile from one or more first fibers, an individual first fiber having a length at least 10 times greater than a width of the individual first fiber, the individual first fiber comprising co-extruded first and second filaments, the first filament formed of a first thermoplastic polymeric material and having a cross section including a concave surface and the second filament formed of a second thermoplastic polymeric material and having a cross section including a convex surface, the co-extruded first and second filaments having an interface at which the concave surface of the first filament directly contacts and partially envelops the convex surface of the second filament, the interface defining an interior surface of the individual first fiber, an exterior surface of the individual first fiber defined by a portion of the first filament along a majority of the length of the individual first fiber and by a portion of the second filament along the majority of the length of the individual first fiber, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity.

Clause 53: A method of forming a textile comprising: forming a textile from one or more first fibers, an individual first fiber having a length at least 10 times greater than a width of the individual first fiber, the individual first fiber comprising co-extruded first and second filaments, the first filament formed of a first thermoplastic polymeric material and having a cross section including a concave surface and the second filament formed of a second thermoplastic polymeric material and having a cross section including a convex surface, the co-extruded first and second filaments having an interface at which the concave surface of the first filament directly contacts and fully envelops the convex surface of the second filament, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity.

Clause 54: A method of forming a textile comprising: forming a textile from one or more first fibers, an individual first fiber having a length at least 10 times greater than a width of the individual first fiber, the individual first fiber comprising co-extruded first and second filaments, the first filament formed of a first thermoplastic polymeric material, the co-extruded first and second filaments having an interface at which the first filament directly contacts the second filament, the interface defining an interior surface of the individual first fiber, an exterior surface of the individual first fiber defined by a portion of the first filament along a majority of the length of the individual first fiber and by a portion of the second filament along the majority of the length of the individual first fiber, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity.

Clause 55: The method as in any one of clauses 52-54, further comprising increasing a temperature of the first region, wherein increasing the temperature of the first region of the textile alters expansion or contraction of the first region of the textile by at least 1 length %, at least 1 width % or at least 1 length % and at least 1 width % on a change in relative humidity of at least 10% over a range of about 30% relative humidity to about 100% relative humidity relative to a state of the first region prior to the increasing the temperature.

Clause 56: The method of clause 55, wherein the first region is increased in temperature from about 30 seconds to about 6 hours.

Clause 57: The method as in any of clauses 55 or 56, wherein the first region is increased in temperature to a temperature ranging from about 50 degrees Celsius to about 280 degrees Celsius.

Clause 58: The method as in any of clauses 52-57, wherein the first region is about 10 wt % to about 100 wt % of the textile.

Clause 59: The method as in any of clauses 52-58, further comprising applying an adhesive to the textile.

Clause 60: The method of clause 59, wherein applying the adhesive to the textile comprises at least one of spraying an adhesive onto the textile and attaching an adhesive film to the textile.

Clause 61: The method as in any of clauses 52-60, further comprising arranging the one or more first fibers in substantially the same direction.

Clause 62: The method as in any of clauses 52-61, wherein the method further comprises a step of receiving the one or more first fibers in the form of a yarn, and the method further comprises a step of knitting, braiding or weaving the yarn to form the first region of the textile.

Clause 63: A garment, garment component, footwear, or footwear component comprising: a textile, a first region of the textile comprising one or more first fibers, an individual first fiber having a length at least 10 times greater than a width of the individual first fiber, the individual first fiber comprising co-extruded first and second filaments, the first filament formed of a first thermoplastic polymeric material and having a cross section including a concave surface and the second filament formed of a second thermoplastic polymeric material and having a cross section including a convex surface, the co-extruded first and second filaments having an interface at which the concave surface of the first filament directly contacts and partially envelops the convex surface of the second filament, the interface defining an interior surface of the individual first fiber, an exterior surface of the individual first fiber defined by a portion of the first filament along a majority of the length of the individual first fiber and by a portion of the second filament along the majority of the length of the individual first fiber, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity.

Clause 64: A garment, garment component, footwear, or footwear component comprising: a textile, a first region of the textile comprising one or more first fibers, an individual first fiber having a length at least 10 times greater than a width of the individual first fiber, the individual first fiber comprising co-extruded first and second filaments, the first filament formed of a first thermoplastic polymeric material and having a cross section including a concave surface and the second filament formed of a second thermoplastic polymeric material and having a cross section including a convex surface, the co-extruded first and second filaments having an interface at which the concave surface of the first filament directly contacts and fully envelops the convex surface of the second filament, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity.

Clause 65: A garment, garment component, footwear, or footwear component comprising: a textile, a first region of the textile comprising one or more first fibers, an individual first fiber having a length at least 10 times greater than a width of the individual first fiber, the individual first fiber comprising co-extruded first and second filaments, the first filament formed of a first thermoplastic polymeric material, the co-extruded first and second filaments having an interface at which the first filament directly contacts the second filament, the interface defining an interior surface of the individual first fiber, an exterior surface of the individual first fiber defined by a portion of the first filament along a majority of the length of the individual first fiber and by a portion of the second filament along the majority of the length of the individual first fiber, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity.

Clause 66. The garment, garment component, footwear, or footwear component of any of clauses 63-65, wherein the first region of the textile contracts or expands by at least 1 width % to about 60 width %, at least 1 length % to about 60 length %, or at least 1 width % to about 60 width % and 1 length % to about 60 length %.

Clause 67: The garment, garment component, footwear, or footwear component as in any of clauses 63-66, wherein the first region of the textile defines about 5% to about 100% of a total surface area of the textile.

Clause 68: The garment, garment component, footwear, or footwear component as in any of clauses 63-67, wherein: the textile further comprises a second region, and the second region contracts or expands by at least 1 length %, at least 1 width % or at least 1 length % and at least 1 width % relative to a resting state on a change in relative humidity of at least 10% over a range of about 30% relative humidity to about 100% relative humidity.

Clause 69: The garment, garment component, footwear, or footwear component of clause 68, wherein the second region of the textile contracts if the first region expands, or the second region expands if the first region contracts.

Clause 70: The garment, garment component, footwear, or footwear component as in any of clauses 63-68, wherein a tensile strength of the first fibers of the second region of the textile differs from a tensile strength of the first fibers of the first region of the textile by at least plus or minus 10%.

Clause 71: The garment, garment component, footwear, or footwear component as in any of clauses 63-70, wherein the first region of the textile comprises heat treated first fibers.

Clause 72: The garment, garment component, footwear, or footwear component as in any of clauses 63-71, wherein the first region of the textile comprises a first concentration of the first fibers and the second region of the textile comprises a second concentration of the first fibers, and the first concentration differs from the second concentration by at least plus or minus 10%.

Clause 73: The garment, garment component, footwear, or footwear component as in any of clauses 63-72, wherein, on an individual fiber basis, a weight percentage of the first filament is at least 5 wt % greater than a weight percentage of the second fiber.

Clause 74: The garment, garment component, footwear, or footwear component as in any of clauses 63-73, wherein the first thermoplastic polymeric material comprises one or more first polymers.

Clause 75: The garment, garment component, footwear, or footwear component of clause 74, wherein the one or more first polymers are about 80 wt % to about 100 wt % of the first thermoplastic polymeric material.

Clause 76: The garment, garment component, footwear, or footwear component as in any of clauses 74 or 75, wherein the one or more first polymers comprise a polyester, a polyamide, a polyurethane, a polyacrylamide, a polycarbonate, a polyether, a cellulose, a polyimide, a copolymer thereof, or a mixture thereof.

Clause 77: The garment, garment component, footwear, or footwear component as in any of clauses 74-76, wherein the one or more first polymers comprise one or more polyamides.

Clause 78: The garment, garment component, footwear, or footwear component as in any of clauses 74-77, wherein the one or more first polymers consist essentially of polyamides.

Clause 79: The garment, garment component, footwear, or footwear component of clause 77 or 78, wherein the polyamides include nylon-6; nylon-4,6; nylon-6,6; nylon-6,10; nylon-11; nylon-12, a copolymer thereof, or a mixture thereof.

Clause 80: The garment, garment component, footwear, or footwear component as in any of clauses 63-79, wherein the first thermoplastic polymeric material absorbs at least 10 wt % water.

Clause 81: The garment, garment component, footwear, or footwear component as in any of clauses 63-80, wherein the first thermoplastic polymeric material comprises a non-polymer additive.

Clause 82: The garment, garment component, footwear, or footwear component of clause 81, wherein the non-polymer additive is about 1 wt % to about 10 wt % of the first thermoplastic polymeric material.

Clause 83: The garment, garment component, footwear, or footwear component as in any of clauses 81 or 82, wherein the non-polymer additive is a sulfonate component, a clay component, a phenolic resin component, a cellulose component, a nanogel component, or a mixture thereof.

Clause 84: The garment, garment component, footwear, or footwear component as in any of clauses 63-83, wherein the second thermoplastic polymeric material comprises one or more second polymers.

Clause 85: The garment, garment component, footwear, or footwear component of clause 84, wherein the one or more second polymers comprise about 80 wt % to about 100 wt % of the second thermoplastic polymeric material.

Clause 86: The garment, garment component, footwear, or footwear component as in any of clauses 84 or 85, wherein the one or more second polymers includes a polyester, a polyether, a polycarbonate, a polyolefin, a polystyrene, a polyacryalte, a polyvinyl chloride, a polyvinyl ether, a fluoropolymer, a copolymer thereof, or a mixture thereof.

Clause 87: The garment, garment component, footwear, or footwear component as in any of clauses 84-86, wherein the one or more second polymers comprise one or more polyesters.

Clause 88: The garment, garment component, footwear, or footwear component as in any of clauses 84-87, wherein the one or more second polymers consist essentially of one or more polyesters.

Clause 89: The garment, garment component, footwear, or footwear component of clause 88, wherein the one or more polyesters include a polyglycolide, a polyactic acid, a polycaprolactone, a polyhydroxyalkanoate, a polyhydroxybutyrate, a polyethylene adipate, a polybutylene succinate, a poly(3-hydroxybutyrate-co-3-hydroxyvalerate), a polyethylene terephthalate, a polybutylene terephthalate, a polytrimethylene terephthalate, a polyethylene naphthalate, a copolymer thereof, or a mixture thereof.

Clause 90: The garment, garment component, footwear, or footwear component as in any of clauses 84-88, wherein the first thermoplastic polymeric material absorbs at least 5 wt % of water more than the second thermoplastic polymeric material.

Clause 91: The garment, garment component, footwear, or footwear component as in any of clauses 84-90, wherein the second thermoplastic polymeric material absorbs less than 2 wt % water.

Clause 92: The garment, garment component, footwear, or footwear component as in any of clauses 63-91, wherein the textile is a non-woven textile.

Clause 93: The garment, garment component, footwear, or footwear component of clause 92, wherein the non-woven textile is a spun-bound non-woven textile, a melt-blown non-woven textile, a needle entangled non-woven textile, or a water-entangled non-woven textile.

Clause 94: The garment, garment component, footwear, or footwear component as in any of clauses 63-93, wherein in the first region, a majority of the first fibers are oriented in substantially the same direction with respect to each other.

Clause 95: The garment, garment component, footwear, or footwear component as in any of clauses 63-94, wherein the textile is a woven textile, a braided textile, a knit textile, or a non-woven textile.

Clause 96: The garment, garment component, footwear, or footwear component as in any of clauses 63-95, wherein the textile comprises one or more yarns comprising the one or more first fibers.

Clause 97: The garment, garment component, footwear, or footwear component as in any of clauses 63-96, wherein the textile is a knit textile.

Clause 98: The garment, garment component, footwear, or footwear component as in any of clauses 63-97, wherein the garment, garment component, footwear, or footwear component comprises a plurality of panels.

Clause 99: The garment, garment component, footwear, or footwear component of clause 98, wherein at least one of the plurality of panels comprises the textile.

Clause 100: The garment, garment component, footwear, or footwear component of clause 99, wherein the textile comprises about 5 wt % to about 100 wt % of the at least one panel.

Clause 101: The garment, garment component, footwear, or footwear component as in any of clauses 63-100, wherein the textile ranges from about 5 wt % to about 100 wt % of the garment, garment component, footwear, or footwear component.

Clause 102: The garment, garment component, footwear, or footwear component as in any of clauses 63-101, wherein the garment, garment component, footwear, or footwear component comprises a plurality of adjacent layers.

Clause 103: The garment, garment component, footwear, or footwear component of clause 102, wherein the textile is joined between the adjacent layers.

Clause 104: The garment, garment component, footwear, or footwear component of clause 102 or 103, wherein at least one of the adjacent layers is an insulative layer.

Clause 105: The garment, garment component, footwear, or footwear component as in any of clauses 63-104, further comprising a slit defined by a surface of the garment, garment component, footwear, or footwear component and extending at least partially through the garment, the garment component, footwear, or footwear component.

Clause 106: The garment, garment component, footwear, or footwear component of clause 105, wherein the slit extends at least partially through the textile.

Clause 107: The garment, garment component, footwear, or footwear component of clause 105 or 106, wherein the slit is adjacent to the textile.

Clause 108: The garment, garment component, footwear, or footwear component as in any of clauses 105-107, wherein the slit is actuatable between a first substantially open position and a second substantially closed position.

Clause 109: The article as in any of clauses 106-108, wherein the slit is in the substantially open position when the textile expands by at least one of the at least 1 length %, at least 1 width %, and at least 1 length % and at least 1 width %.

Clause 110: The article as in any of clauses 106-108, wherein the slit is in the substantially closed position when the textile contracts by at least one of the at least 1 length %, at least 1 width %, and at least 1 length % and at least 1 width %.

Clause 111: The garment, garment component, footwear, or footwear component as in any of clauses 63-110, wherein the garment, garment component, footwear, or footwear component is the garment or garment component.

Clause 112: The garment or garment component of clause 111, wherein the garment or garment component comprise a plurality of panels.

Clause 113: The garment, garment component, footwear, or footwear component as in any of clauses 63-112, wherein the garment, garment component, footwear, or footwear component is the footwear or footwear component.

Clause 114: The footwear or footwear component as in clause 113, wherein the footwear or footwear component is footwear, and the footwear comprises a sole structure; and an upper connected to the sole structure to form an enclosure to at least partially receive a foot, and wherein the upper comprises the textile.

Clause 115: The footwear of clause 113, wherein the textile defines about 5 wt % to about 100 wt % of the upper.

Clause 116: A method of forming a garment, a garment component, footwear, or a footwear component comprising receiving the textile as in any one of clauses 63-115, and incorporating the textile into the garment, garment component, footwear, or footwear component.

Clause 117: A method of forming a garment, a garment component, footwear, or a footwear component, the method comprising: forming a textile from one or more first fibers, an individual first fiber having a length at least 10 times greater than a width of the individual first fiber, the individual first fiber comprising co-extruded first and second filaments, the first filament formed of a first thermoplastic polymeric material and having a cross section including a concave surface and the second filament formed of a second thermoplastic polymeric material and having a cross section including a convex surface, the co-extruded first and second filaments having an interface at which the concave surface of the first filament directly contacts and partially envelops the convex surface of the second filament, the interface defining an interior surface of the individual first fiber, an exterior surface of the individual first fiber defined by a portion of the first filament along a majority of the length of the individual first fiber and by a portion of the second filament along the majority of the length of the individual first fiber, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity; and incorporating the textile into a garment, a garment component, footwear, or a footwear component.

Clause 118: A method of forming a garment, a garment component, footwear, or a footwear component, comprising: forming a textile from one or more first fibers, an individual first fiber having a length at least 10 times greater than a width of the individual first fiber, the individual first fiber comprising co-extruded first and second filaments, the first filament formed of a first thermoplastic polymeric material and having a cross section including a concave surface and the second filament formed of a second thermoplastic polymeric material and having a cross section including a convex surface, the co-extruded first and second filaments having an interface at which the concave surface of the first filament directly contacts and fully envelops the convex surface of the second filament, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity; and incorporating the textile into a garment, a garment component, footwear, or a footwear component.

Clause 119: A method of forming a garment, a garment component, footwear, or a footwear component, comprising: forming a textile from one or more first fibers, an individual first fiber having a length at least 10 times greater than a width of the individual first fiber, the individual first fiber comprising co-extruded first and second filaments, the first filament formed of a first thermoplastic polymeric material, the co-extruded first and second filaments having an interface at which the first filament directly contacts the second filament, the interface defining an interior surface of the individual first fiber, an exterior surface of the individual first fiber defined by a portion of the first filament along a majority of the length of the individual first fiber and by a portion of the second filament along the majority of the length of the individual first fiber, the first and second filaments being joined to each other at the interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity; and incorporating the textile into a garment, a garment component, footwear, or a footwear component.

Clause 120: The method as in any one of clauses 117-119, further comprising increasing a temperature of the first region, wherein increasing the temperature of the first region of the textile alters expansion or contraction of the first region of the textile by at least 1 length %, at least 1 width % or at least 1 length % and at least 1 width % on a change in relative humidity of at least 10% over a range of about 30% relative humidity to about 100% relative humidity relative to a state of the first region prior to the increasing the temperature.

Clause 121: The method of clause 117, wherein the first region is increased in temperature from about 30 seconds to about 6 hours.

Clause 122: The method as in any of clauses 117 or 118, wherein the first region is increased in temperature to a temperature ranging from about 50 degrees Celsius to about 280 degrees Celsius.

Clause 123: The method as in any of clauses 117-119, wherein the first region is about 10 wt % to about 100 wt % of the textile.

Clause 124: The method as in any of clauses 117-123, further comprising applying an adhesive to the textile.

Clause 125: The method of clause 124, wherein applying the adhesive to the textile comprises at least one of spraying an adhesive onto the textile and attaching an adhesive film to the textile.

Clause 126: The method as in any of clauses 117-125, further comprising arranging the one or more first fibers in substantially the same direction.

Clause 127: The method as in any of clauses 117-126, wherein the method further comprises a step of receiving the one or more first fibers in the form of a yarn, and the method further comprises a step of knitting, braiding or weaving the yarn to form the first region of the textile.

Clause 128: A textile comprising: a first region of the textile comprising one or more first fibers, an individual first fiber having a length at least 10 times greater than a width of the individual first fiber, the individual first fiber comprising co-extruded first and second filaments, the first filament formed of a first thermoplastic polymeric material, the co-extruded first and second filaments having an interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity.

Clause 129: The textile of clause 128, wherein the first and second filaments are substantially laminated to each other at the interface along the majority of the length of the individual first fiber.

Clause 130: The textile of clause 129, wherein the first fiber has the characteristic that it will contract upon a change in relative humidity of at least 10% over a range of about 30% relative humidity to about 100% relative humidity, relative to an equilibrium state of the first region prior to the change in relative humidity.

Clause 131: The textile of clause 128, wherein the first and second filaments are substantially delaminated at the interface along the majority of the length of the individual first fiber.

Clause 132: The textile of clause 131, wherein the first fiber has the characteristic that it will expand upon a change in relative humidity of at least 10% over a range of about 30% relative humidity to about 100% relative humidity, relative to an equilibrium state of the first region prior to the change in relative humidity.

Clause 133: The textile of clause 128, wherein the interface defines an interior surface of the individual first fiber, an exterior surface of the individual first fiber defined by a portion of the first filament along a majority of the length of the individual first fiber and by a portion of the second filament along the majority of the length of the individual first fiber.

Clause 134: The textile of clause 128, wherein the first filament has a cross section including a concave surface and the second filament formed of a second thermoplastic polymeric material and having a cross section including a convex surface.

Clause 135: The textile of clause 134, wherein the co-extruded first and second filaments have the interface at which the concave surface of the first filament directly contacts and partially envelops the convex surface of the second filament.

Clause 136: The textile of clause 134, wherein the second filament formed of a second thermoplastic polymeric material, wherein the interface at which the concave surface of the first filament directly contacts and fully envelops the convex surface of the second filament.

Clause 137: The textile of clause 128, wherein the first region is present is a garment, a garment component, footwear, or a footwear component.

Clause 138: The textile of clause 128, wherein the textile is a woven textile, a braided textile, a knit textile, or a non-woven textile.

Clause 139: The textile of clause 128, wherein the first region of the textile contracts or expands by at least 1 width % to about 60 width %, at least 1 length % to about 60 length %, or at least 1 width % to about 60 width % and 1 length % to about 60 length % relative to a resting state on a change in relative humidity of at least 10% over a range of about 30% relative humidity to about 100% relative humidity; wherein the textile further comprises a second region, and the second region contracts or expands by at least 1 length %, at least 1 width % or at least 1 length % and at least 1 width % relative to a resting state on a change in relative humidity of at least 10% over a range of about 30% relative humidity to about 100% relative humidity; wherein the second region of the textile contracts if the first region expands, or the second region expands if the first region contracts.

Clause 140: The textile of clause 128, wherein the first thermoplastic polymeric material comprises one or more first polymers, wherein the one or more first polymers comprise a polyester, a polyamide, a polyurethane, a polyacrylamide, a polycarbonate, a polyether, a cellulose, a polyimide, a copolymer thereof, or a mixture thereof.

Clause 141: The textile of clause 128, wherein the first thermoplastic polymeric material comprises a non-polymer additive, wherein the non-polymer additive is a sulfonate component, a clay component, a phenolic resin component, a cellulose component, a nanogel component, or a mixture thereof.

Clause 142: The textile of clause 136, wherein the second thermoplastic polymeric material comprises one or more second polymers. wherein the one or more second polymers includes a polyester, a polyether, a polycarbonate, a polyolefin, a polystyrene, a polyacrylate, a polyvinyl chloride, a polyvinyl ether, a fluoropolymer, a copolymer thereof, or a mixture thereof.

Clause 143: An article comprising the textile of clause 128.

Clause 144: The article of clause 143, wherein the article comprises a plurality of panels, wherein at least one of the plurality of panels comprises the textile, wherein the article includes a slit defined by a surface of the article and extending at least partially through the article.

Clause 145: The article of clause 144, wherein the slit is in the substantially open position when the textile expands by at least one of the at least 1 length %, at least 1 width %, and at least 1 length % and at least 1 width %, wherein the slit is in the substantially closed position when the textile contracts by at least one of the at least 1 length %, at least 1 width %, and at least 1 length % and at least 1 width %.

Clause 146: The article of claim 145, wherein the first region is present is a garment, a garment component, footwear, or a footwear component.

Clause 147: A method of forming a textile comprising: forming a textile from one or more first fibers, an individual first fiber having a length at least 10 times greater than a width of the individual first fiber, the individual first fiber comprising co-extruded first and second filaments, the first filament formed of a first thermoplastic polymeric material, the co-extruded first and second filaments having an interface along the majority of the length of the individual first fiber; wherein, due to expansion or contraction of the one or more first fibers, the first region of the textile contracts or expands by at least 1 length %, at least 1 width %, or at least 1 length % and at least 1 width % on a change in relative humidity of at least 10% over a range of about 30% relative humidity to about 100% relative humidity, relative to an equilibrium state of the first region prior to the change in relative humidity incorporating the textile into a garment, a garment component, footwear, or a footwear component.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an aspects, "about 0" can refer to 0, 0.001, 0.01, or 0.1. In an aspects, the term "about" can include traditional rounding according to significant figures of the numerical value. In addition, the phrase "about 'x' to 'y'" includes "about 'x' to about 'y'".

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The invention claimed is:

1. A textile comprising:
   a first layer;
   a second layer adjacent the first layer;
   one or more first fibers attached to the first layer and the second layer; and
   an elastic component attached to the first layer and the second layer, the elastic component and the one or more first fibers being positioned adjacent each other;
   wherein:
      the elastic component exerts an expanding force upon the first layer and the second layer that biases the second layer away from the first layer;
      the one or more first fibers, in a first equilibrium state where the first layer is a first distance away from the second layer, exert a first contracting force upon the first layer and the second layer in opposition to the expanding force;
      upon exposure to a moisture stimulus, the one or more first fibers contract to exert a second contracting force upon the first layer and the second layer that is greater than the expanding force so that the first layer and the second layer move towards each other; and
      upon removal of the moisture stimulus, the one or more first fibers revert back to the first equilibrium state.

2. The textile of claim 1, wherein the second layer comprises an insulation material.

3. The textile of claim 1, wherein the second layer comprises an outer surface opposite the first layer.

4. The textile of claim 3, wherein the one or more first fibers is attached to the outer surface.

5. The textile of claim 1, wherein the one or more first fibers comprises co-extruded first and second filaments.

6. The textile of claim 5, wherein the co-extruded first and second filaments have an interface along the majority of the length of each of the individual first fibers.

7. The textile of claim 6, wherein the first and second filaments are substantially laminated to each other at the interface along the majority of the length of each of the individual first fibers.

8. The textile of claim 1, wherein the elastic component comprises polyurethane.

9. The textile of claim 8, wherein the elastic component comprises thermoplastic polyurethane.

* * * * *